United States Patent
Osagawa

(10) Patent No.: US 10,353,346 B2
(45) Date of Patent: *Jul. 16, 2019

(54) CORRECTION PARAMETER CALCULATION DEVICE, SYSTEM, CORRECTION PARAMETER CALCULATION METHOD, AND COMPUTER PROGRAM

(71) Applicant: MITSUBISHI ELECTRIC CORPORATION, Tokyo (JP)

(72) Inventor: Daisuke Osagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,871

(22) Filed: Apr. 11, 2018

(65) Prior Publication Data

US 2018/0231941 A1  Aug. 16, 2018

Related U.S. Application Data

(62) Division of application No. 14/406,865, filed as application No. PCT/JP2012/073120 on Sep. 11, 2012, now Pat. No. 10,197,974.

(51) Int. Cl.
  *G04R 20/00* (2013.01)
  *H04J 3/06* (2006.01)
  *G05B 15/02* (2006.01)

(52) U.S. Cl.
  CPC ............. *G04R 20/00* (2013.01); *G05B 15/02* (2013.01); *H04J 3/0638* (2013.01); *H04J 3/065* (2013.01)

(58) Field of Classification Search
  CPC ....... G04R 20/00; G05B 15/02; H04J 3/0638; H04J 3/065

(Continued)

(56) References Cited

U.S. PATENT DOCUMENTS 4,366,371 A  12/1982  d'Alayer de Costemore d'Arc et al.
7,076,150 B2  7/2006  Morinaga et al.
(Continued)

FOREIGN PATENT DOCUMENTS

CN  1322072 A  11/2001
CN  1592163 A   3/2005
(Continued)

OTHER PUBLICATIONS

International Search Report dated Dec. 4, 2012 in PCT/JP2012/073120.

(Continued)

*Primary Examiner* — Yoshihisa Ishizuka
(74) *Attorney, Agent, or Firm* — Oblon, McClelland, Maier & Neustadt, L.L.P.

(57) ABSTRACT

Even if the propagation time interval of a sync signal is not constant, an accurate correction parameter is calculated, so that a corrected time point synchronized with a main clock device is obtained. A main transmission time point storage part stores respective main transmission time points at which a main device has transmitted a plurality of main sync signals and which are measured using a main clock device. A subordinate reception time point storage part stores respective subordinate reception time points at which a subordinate device has received the plurality of main sync signals and which are measured using a subordinate clock device. A speed ratio calculation part calculates a speed ratio of a ticking time speed of the main clock device to a ticking time speed of the subordinate clock device, based on a main transmission mean time point being a mean of the main transmission time points and a subordinate reception mean time point being a mean of the subordinate reception time points.

8 Claims, 17 Drawing Sheets

(58) Field of Classification Search
USPC .................................................. 702/176
See application file for complete search history.

(56) References Cited

U.S. PATENT DOCUMENTS

| | | | |
|---|---|---|---|
| 7,260,149 | B2 | 8/2007 | Kirihara et al. |
| 7,447,237 | B2 | 11/2008 | Koshino et al. |
| 8,189,624 | B2 | 5/2012 | Sakurada et al. |
| 8,370,676 | B2 | 2/2013 | Matsunaga |
| 8,576,883 | B2 | 11/2013 | Lansdowne |
| 8,750,078 | B2 | 6/2014 | Inomata |
| 2002/0015400 | A1 | 2/2002 | Morinaga et al. |
| 2003/0048811 | A1 | 3/2003 | Robie, Jr. et al. |
| 2004/0109474 | A1* | 6/2004 | Koshino ............... H04J 3/0658 370/503 |
| 2004/0141526 | A1* | 7/2004 | Balasubramanian . H04J 3/0667 370/503 |
| 2005/0013377 | A1 | 1/2005 | Kirihara et al. |
| 2005/0180466 | A1 | 8/2005 | Franchuk |
| 2008/0056666 | A1 | 3/2008 | Mio |
| 2008/0075217 | A1 | 3/2008 | Ilnicki et al. |
| 2009/0222589 | A1* | 9/2009 | Kirsch ..................... G04G 5/00 709/248 |
| 2009/0296795 | A1* | 12/2009 | Lindqvist .............. H04J 3/0667 375/224 |
| 2010/0118721 | A1 | 5/2010 | Sakurada et al. |
| 2010/0209070 | A1 | 8/2010 | Inomata |
| 2010/0250781 | A1 | 9/2010 | Matsunaga |
| 2011/0051754 | A1 | 3/2011 | Lansdowne |
| 2013/0243140 | A1 | 9/2013 | Buhl |

FOREIGN PATENT DOCUMENTS

| | | | |
|---|---|---|---|
| CN | 101141580 | A | 3/2008 |
| CN | 101636972 | A | 1/2010 |
| CN | 202067126 | U | 12/2011 |
| CN | 102577194 | A | 7/2012 |
| JP | 2000-224766 | A | 8/2000 |
| JP | 2004-186877 | A | 7/2004 |
| JP | 2005-303632 | A | 10/2005 |
| JP | 2007-104347 | A | 4/2007 |
| JP | 2008-262292 | A | 10/2008 |
| JP | 2010-190635 | A | 9/2010 |
| JP | 2010-232845 | A | 10/2010 |
| JP | 2011-023788 | A | 2/2011 |
| JP | 2011-035696 | A | 2/2011 |
| JP | 2011-135482 | A | 7/2011 |
| TW | 201113664 | A1 | 4/2011 |
| TW | 1421667 | B | 1/2014 |

OTHER PUBLICATIONS

Office Action dated Dec. 2, 2014 in Taiwanese Patent Application 101139416 (with partial English language translation).
Combined Office Action and Search Report dated Dec. 20, 2016 in Chinese Patent Application No. 201280075748.7 (with Partial English Translation of Office Action and English Translation of Categories of Cited Documents).
Chinese Office Action dated Aug. 10, 2017 in Patent Application No. 201280075748.7 (with English Translation).
Macroption (Arithmetic Average Advantages and Disadvantages) Wayback Machine (https://web.archive.org/web/20120325014805/http://www.macroption.com/arithmetic-average-advantages-disadvantages/) Mar. 25, 2012.
Office Action dated Jan. 26, 2018 in Chinese Patent Application No. 201280075748.7, with English-language Translation, 9 pages.
Chu Zhongqi, Modern Communication New Technology, Beijing, Mechanical Industry Publish House, Feb. 28, 1998, 2 pages.
Office Action dated Dec. 7, 2018 in corresponding German Patent Application No. 11 2012 006 890.4 (with English Translation), 15 pages.

* cited by examiner

CORRECTION PARAMETER CALCULATION DEVICE, SYSTEM, CORRECTION PARAMETER CALCULATION METHOD, AND COMPUTER PROGRAM

CROSS-REFERENCE TO RELATED APPLICATIONS

The present application is a divisional of U.S. application Ser. No. 14/406,865 filed Dec. 10, 2014, which is a National Phase of PCT/JP2012/073120 filed Sep. 11, 2012, the entire contents of both of which are incorporated herein by reference.

TECHNICAL FIELD

The present invention relates to a correction parameter calculation device that calculates a correction parameter used for obtaining a synchronized time point.

BACKGROUND ART

There is a need to synchronize a plurality of clocks accurately.

For example, in factory automation (FA), there is a case where one control apparatus controls a plurality of machine tools via a network. In order to realize highly accurate control, the plurality of machine tools are controlled based on time point information. For example, a motor for X-axis movement and a motor for Y-axis movement are started to rotate at the same time point at the same rotation frequency, so that a straight trajectory is drawn. If any one motor starts to rotate with a delay, the trajectory forms an angle, and a straight trajectory cannot be drawn. For this reason, the time points of the plurality of machine tools need to coincide to each other via the network.

The time interval taken for propagation of communication via the network is not constant. For example, due to fluctuation of the relay delay time interval of a relay device or fluctuation of the propagation speed of a cable, the propagation time interval is different each time. This makes it difficult to synchronize the time via the network. As a technique that suppresses the influence of the fluctuation of the propagation time interval and calculates the difference (quartz deviation ratio) among clock speeds that results from an error and the like of the quartz oscillation frequency, for example, Patent Literature 1 is available.

CITATION LIST

Patent Literature

Patent Literature 1: JP 2011-023788

SUMMARY OF INVENTION

Technical Problem

According to the technique descried in Patent Literature 1, communications are carried out a plurality of times, and among them a communication that takes the shortest propagation time interval is supposed to be a communication free from fluctuation of the propagation time interval. In practice, however, even a communication having the shortest propagation time interval possibly includes fluctuation of the propagation time interval.

It is an object of the present invention to calculate an accurate correction parameter even when the propagation time interval of a sync signal is not constant, thereby obtaining a synchronized time.

Solution to Problem

A correction parameter calculation device according to the present invention has:

a main transmission time point storage part that stores respective main transmission time points at which a main device has transmitted a plurality of main sync signals and which are measured using a main clock device;

a subordinate reception time point storage part that stores respective subordinate reception time points at which a subordinate device has received the plurality of main sync signals and which are measured using a subordinate clock device; and a speed ratio calculation part that calculates a speed ratio of a ticking time speed of the main clock device to a ticking time speed of the subordinate clock device, based on a main transmission mean time point being a mean of the main transmission time points and a subordinate reception mean time point being a mean of the subordinate reception time points.

Advantageous Effects of Invention

With the correction parameter calculation device according to the present invention, even when the propagation time interval of the sync signal is not constant, an accurate correction parameter can be calculated. As a result, a corrected time point that is synchronized with the main clock device can be obtained.

DESCRIPTION OF EMBODIMENTS

Embodiment 1

Embodiment 1 will be described with reference to FIGS. 1 to 14.

Figure 1:
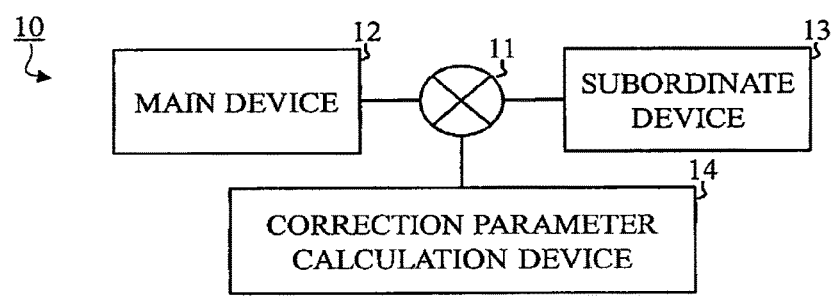
FIG. 1 shows an example of the overall configuration of a time point synchronization system 10 according to Embodiment 1.

FIG. 1 shows an example of the overall configuration of a time point synchronization system 10 according to this embodiment.

The time point synchronization system 10 has, for example, a network 11, a main device 12, a subordinate device 13, and a correction parameter calculation device 14. The time point synchronization system 10 can have a plurality of subordinate devices 13.

The network 11 mediates communication among the main device 12, the subordinate device 13, and the correction parameter calculation device 14. The network 11 is, for example, a local area network (LAN) or the like.

The main device 12 has a main clock device. The main clock device measures the time point. The time point measured by the main clock device will be called "main time point". The main time point serves as a reference time point in the time point synchronization system 10.

The subordinate device 13 has a subordinate clock device. The subordinate clock device measures the time point. The time point measured by the subordinate clock device will be called "subordinate time point". The main time point and the subordinate time point do not necessarily coincide. The ticking time speed of the main time point will be called "main clock speed". The ticking time speed of the subordinate time point will be called "subordinate clock speed". The main clock speed and the subordinate clock speed do not necessary coincide due to the influence of the quartz oscillation error and the like. Therefore, the difference between the main time point and the subordinate time point changes as the time passes.

Hence, the subordinate device 13 calculates a time point obtained by correcting subordinate time point. The time point corrected by the subordinate device 13 will be called "corrected time point". The corrected time point synchronizes with the main time point. The subordinate device 13 controls the operation timing and the like based on the corrected time point, so that the subordinate device 13 operates in accurate synchronism with the main device 12 and other subordinate devices 13.

The correction parameter calculation device 14 calculates a parameter with which the subordinate device 13 corrects the subordinate time point. The parameter calculated by the correction parameter calculation device 14 will be called "correction parameter". The correction parameter includes, for example, a speed ratio, reference time point, and the like.

The speed ratio is the ratio of the main clock speed to the subordinate clock speed.

The reference time point includes a main time point (to be referred to as "main reference time point" hereinafter) and a subordinate time point (to be referred to as "subordinate reference time point" hereinafter) at a certain time point.

When the subordinate time point coincides with the subordinate reference time point, the main time point coincides with the main reference time point.

When the subordinate time point coincides with a time point elapsed from the subordinate reference time point by a predetermined time interval, the main time point coincides with a time point elapsed from the main reference time point by a time interval obtained by multiplying the elapsed time interval by the speed ratio.

Namely, the following relation is established.

$$m = a(s - s_0) + m_0$$

Note that m represents the main time point, a represents the speed ratio, s represents the subordinate time point, $s_0$ represents the subordinate reference time point, and $m_0$ represents the main reference time point.

The subordinate device 13, based on the speed ratio calculated by the correction parameter calculation device 14 and the reference time point, calculates the value of the right side of this equation, thus calculating the corrected time point from the subordinate time point. The corrected time point calculated by the subordinate device 13 coincides with the main time point.

The correction parameter calculation device 14 may be formed integrally with the main device 12 or the subordinate device 13. Alternatively, part of the correction parameter calculation device 14 may be formed integrally with the main device 12, and the remaining part of the correction parameter calculation device 14 may be formed integrally with the subordinate device 13.

The main device 12 transmits a sync signal a plurality of times to the subordinate device 13 via the network 11. The sync signal that the main device 12 transmits to the subordinate device 13 will be called "main sync signal". The subordinate device 13 receives the main sync signal transmitted by the main device 12, a plurality of times via the network 11.

Also, the subordinate device 13 transmits a sync signal a plurality of times to the main device 12 via the network 11. The sync signal that the subordinate device 13 transmits to the main device 12 will be called "subordinate sync signal". The main device 12 receives the subordinate sync signal transmitted by the subordinate device 13, a plurality of times via the network 11.

The time interval taken since the sync signal is transmitted until the sync signal is received will be called "propagation time interval". Since the communication between the main device 12 and the subordinate device 13 is carried via the network 11, the propagation time interval is not always constant.

The main device 12, using the main clock device, measures the time point at which it has transmitted the main sync signal and the time point at which it has received the subordinate sync signal. The time point at which the main device 12 has transmitted the main sync signal and which is measured using the main clock device, will be called "main transmission time point". The time point at which the main device 12 has received the subordinate sync signal, the time point being measured using the main clock device, will be called "main reception time point".

The subordinate device 13, using the subordinate clock device, measures the time point at which it has received the main sync signal and the time point at which it has transmitted the subordinate sync signal. The time point at which the subordinate device 13 has received the main sync signal and which is measured using the subordinate clock device, will be called "subordinate reception time point". The time point at which the subordinate device 13 has transmitted the subordinate sync signal and which is measured using the subordinate clock device, will be called "subordinate transmission time point".

The correction parameter calculation device 14 calculates the correction parameter based on the main transmission time point, the main reception time point, the subordinate reception time point, and the subordinate transmission time point.

Figure 2:
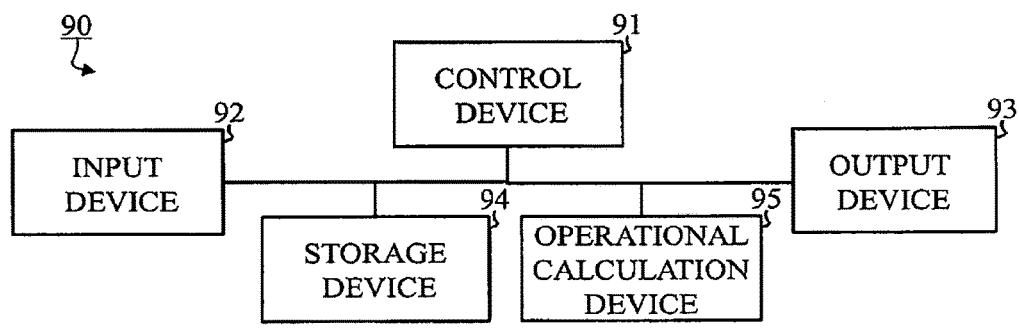
FIG. 2 shows an example of the hardware resources of a computer 90 according to Embodiment 1.

FIG. 2 shows an example of the hardware resources of a computer 90 according to this embodiment.

Each of the main device 12, the subordinate device 13, and the correction parameter calculation device 14 has a computer 90.

The computer 90 has, for example, a control device 91, an input device 92, an output device 93, a storage device 94, and an operational calculation device 95.

The control device 91 executes a computer program stored in the storage device 94, thereby controlling the computer 90 as a whole, so that a programmed function is implemented.

The storage device 94 stores the computer program executed by the control device 91, digital data used by the operational calculation device 95 for operational calculation, and the like. The storage device 94 is, for example, a primary storage device such as a volatile memory or non-volatile memory, an external storage device such as a magnetic disc device or optical disc device, or the like.

The operational calculation device 95 carries out an operational calculation such as arithmetic operation, logic operation, and the like. The operational calculation device 95 carries out the operational calculation using the digital data stored in, for example, the storage device 94, thereby generating digital data that represents the operational calculation result. The digital data generated by the operational calculation device 95 is stored in, for example, the storage device 94.

The input device 92 receives information from outside of the computer 90 and converts the information into digital data. The digital data converted by the input device 92 is, for example, stored in the storage device 94, or used by the operational calculation device 95 for operational calculation. The input device 92 is, for example, an operation input device such as a keyboard or mouse, a voice input device such as a microphone, an image input device such as a camera or scanner, a measuring device which measures a physical quantity such as temperature or pressure, a reception device which receives a signal transmitted by another device, or the like.

The output device 93 converts, for example, the digital data stored in the storage device 94 or the digital data generated by the operational calculation device 95, and outputs the converted digital data to the outside of the computer 90. The output device 93 is, for example, a display device which displays characters and images, a voice output device such as a loudspeaker, a printing device which prints characters and images, a transmission device which transmits a signal to another device, or the like.

The functional blocks such as the main device 12, the subordinate device 13, the correction parameter calculation device 14, and the like to be described hereinafter can be realized when, for example, the control device 91 executes the computer program stored in the storage device 94. However, these functional blocks need not always be implemented by the computer 90. These functional blocks may be implemented by a configuration other than the computer 90, for example, an electrical configuration such as a digital circuit or analog circuit, a mechanical configuration, or the like.

Figure 3:
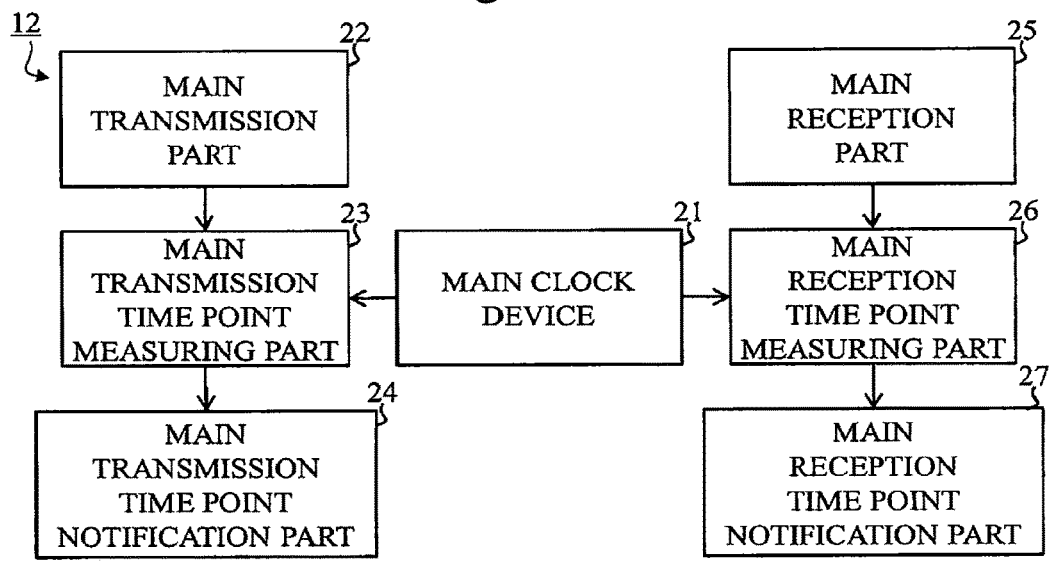
FIG. 3 shows an example of the configuration of the functional blocks of a main device 12 according to Embodiment 1.

FIG. 3 shows an example of the configuration of the functional blocks of the main device 12 according to this embodiment.

The main device 12 has, for example, a main clock device 21, a main transmission part 22, a main transmission time point measuring part 23, a main transmission time point notification part 24, a main reception part 25, a main reception time point measuring part 26, and a main reception time point notification part 27.

The main clock device 21 measures the time point.

The main transmission part 22 transmits the main sync signal to the subordinate device 13 a plurality of times.

The main transmission time point measuring part 23, using the main clock device 21, measures each of the time points at which the main transmission part 22 has transmitted the main sync signal.

The main transmission time point notification part 24 notifies the correction parameter calculation device 14 of a plurality of main transmission time points measured by the main transmission time point measuring part 23.

The main reception part 25 receives the subordinate sync signal transmitted by the subordinate device 13, a plurality of times.

The main reception time point measuring part 26, using the main clock device 21, measures each of the time points at which the main reception part has received the subordinate sync signal.

The main reception time point notification part 27 notifies the correction parameter calculation device 14 of the plurality of main reception time points measured by the main reception time point measuring part 26.

Figure 4:
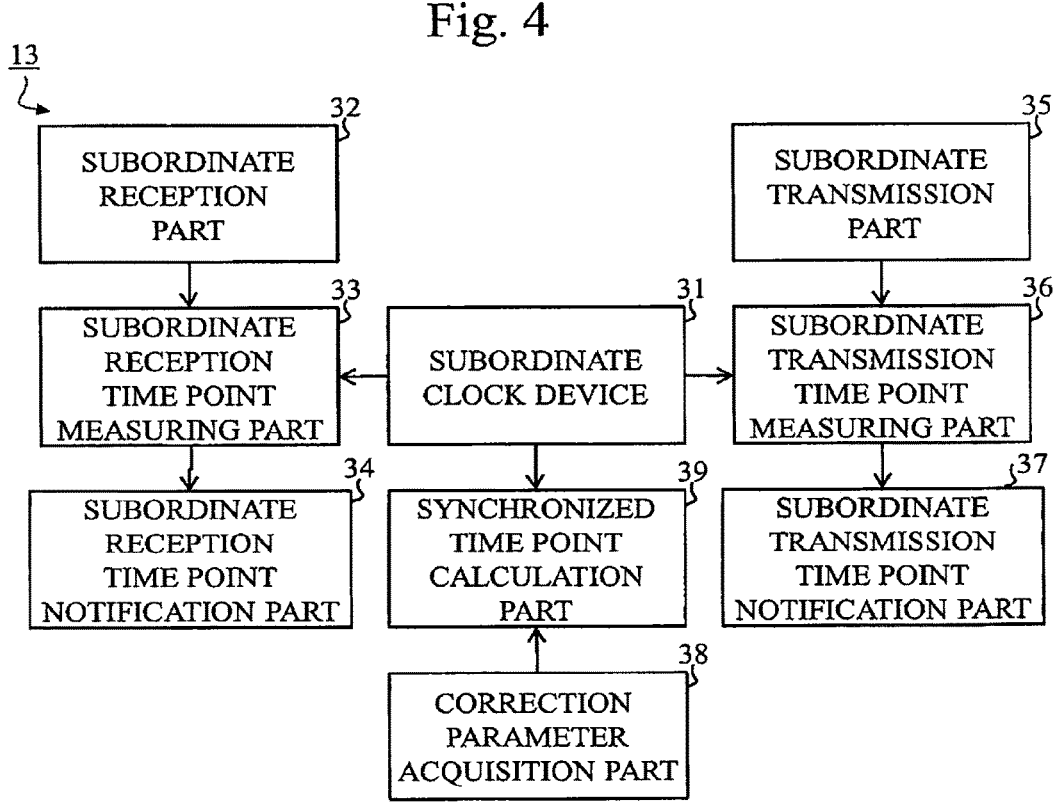
FIG. 4 shows an example of the configuration of the functional blocks of a subordinate device 13 according to Embodiment 1.

FIG. 4 shows an example of the configuration of the functional blocks of the subordinate device 13 according to this embodiment.

The subordinate device 13 has, for example, a subordinate clock device 31, a subordinate reception part 32, a subordinate reception time point measuring part 33, a subordinate reception time point notification part 34, a subordinate transmission part 35, a subordinate transmission time point measuring part 36, a subordinate transmission time point notification part 37, a correction parameter acquisition part 38, and a synchronized time point calculation part 39.

The subordinate clock device 31 measures the time point.

The subordinate reception part 32 receives the main sync signal transmitted by the main device 12, a plurality of times.

The subordinate reception time point measuring part 33, using the subordinate clock device 31, measures each of the time points at which the subordinate reception part 32 has received the main sync signal.

The subordinate reception time point notification part 34 notifies the correction parameter calculation device 14 of a plurality of subordinate reception time points measured by the subordinate reception time point measuring part 33.

The subordinate transmission part 35 transmits the subordinate sync signal to the main device 12 a plurality of times.

The subordinate transmission time point measuring part 36, using the subordinate clock device 31, measures each of the time points at which the subordinate transmission part 35 has transmitted the subordinate sync signal.

The subordinate transmission time point notification part 37 notifies the correction parameter calculation device 14 of the plurality of subordinate transmission time points measured by the subordinate transmission time point measuring part 36.

The correction parameter acquisition part 38 acquires the correction parameter calculated by the correction parameter calculation device 14.

The synchronized time point calculation part 39, based on the correction parameter acquired by the correction parameter acquisition part 38, corrects the subordinate time point measured by the subordinate clock device 31, thereby calculating the corrected time point.

Figure 5:
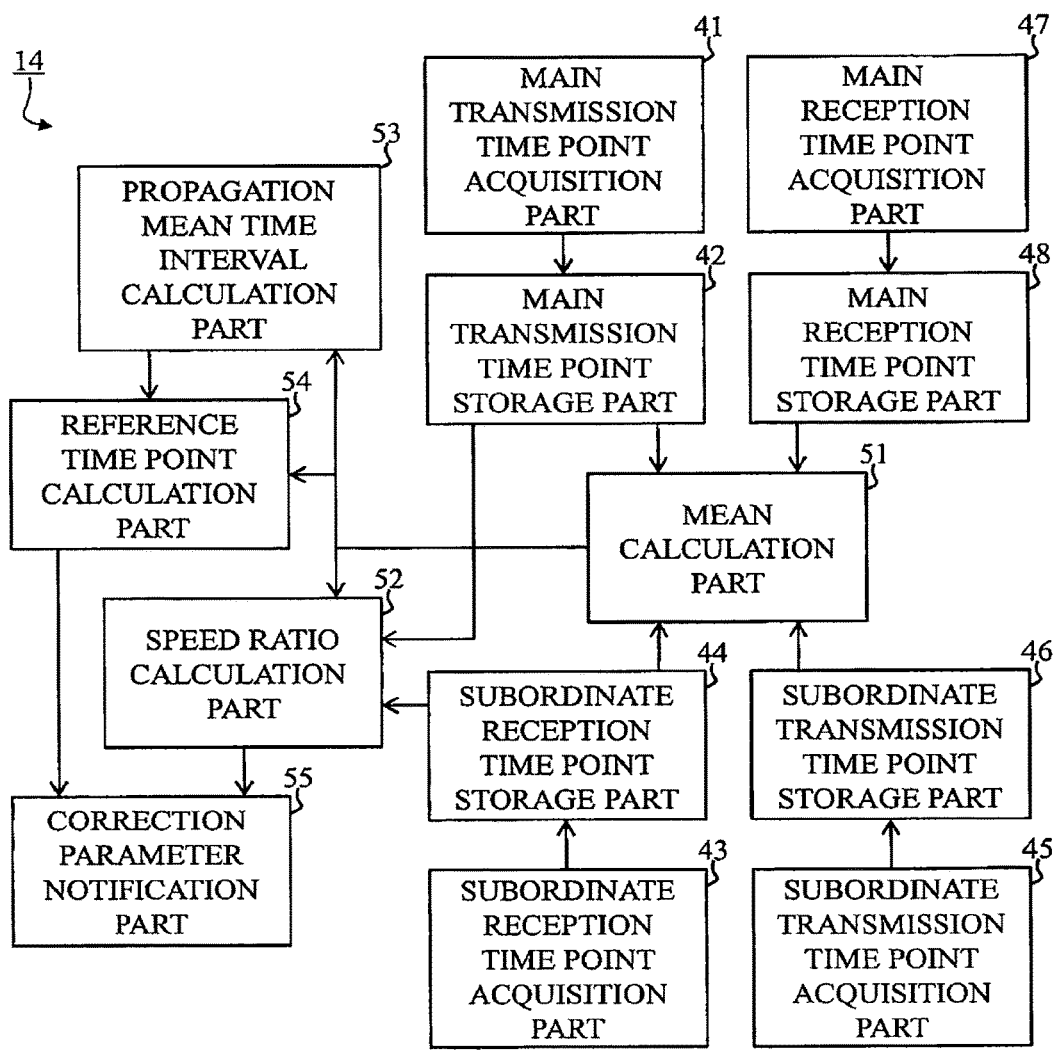
FIG. 5 shows an example of the configuration of the functional blocks of a correction parameter calculation device 14 according to Embodiment 1.

FIG. 5 shows an example of the configuration of the functional blocks of the correction parameter calculation device 14 according to this embodiment.

The correction parameter calculation device 14 has, for example, a main transmission time point acquisition part 41, a main transmission time point storage part 42, a subordinate reception time point acquisition part 43, a subordinate reception time point storage part 44, a subordinate transmission time point acquisition part 45, a subordinate transmission time point storage part 46, a main reception time point acquisition part 47, a main reception time point storage part 48, a mean calculation part 51, a speed ratio calculation part 52, a propagation mean time interval calculation part 53, a reference time point calculation part 54, and a correction parameter notification part 55.

The main transmission time point acquisition part 41 acquires the plurality of main transmission time points notified of by the main device 12.

The main transmission time point storage part 42 stores the plurality of main transmission time points acquired by the main transmission time point acquisition part 41.

The subordinate reception time point acquisition part 43 acquires the plurality of reception time points notified of by the subordinate device 13.

The subordinate reception time point storage part 44 stores the plurality of subordinate reception time points acquired by the subordinate reception time point acquisition part 43.

The subordinate transmission time point acquisition part 45 acquires the plurality of subordinate transmission time points notified of by the subordinate device 13.

The subordinate transmission time point storage part 46 stores the plurality of subordinate transmission time points acquired by the subordinate transmission time point acquisition part 45.

The main reception time point acquisition part 47 acquires the plurality of main reception time points notified of by the main device 12.

The main reception time point storage part 48 stores the plurality of main reception time points acquired by the main reception time point acquisition part 47.

The mean calculation part 51 calculates a mean value. For example, the mean calculation part 51 calculates the mean value of the plurality of main transmission time points stored in the main transmission time point storage part 42. The mean value obtained by averaging the main transmission time points will be called "main transmission mean time point". The mean calculation part 51 calculates the mean value of the plurality of subordinate reception time points stored in the subordinate reception time point storage part 44. The mean value of the subordinate reception time points will be called "subordinate reception mean time point". The mean calculation part 51 calculates the mean value of the plurality of subordinate transmission time points stored in the subordinate transmission time point storage part 46. The mean value of the subordinate transmission time points will be called "subordinate transmission mean time point". The mean calculation part 51 calculates the mean value of the plurality of main reception time points stored in the main reception time point storage part 48. The mean value of the main reception time points will be called "main reception mean time point".

The speed ratio calculation part 52 calculates the speed ratio. For example, the speed ratio calculation part 52 calculates the speed ratio based on the mean value calculated by the mean calculation part 51, the main transmission time point stored in the main transmission time point storage part 42, and the subordinate reception time point stored in the subordinate reception time point storage part 44.

The propagation mean time interval calculation part 53 calculates the propagation mean time interval. The propagation mean time interval is the mean value of the propagation time intervals of the sync signal. For example, the propagation mean time interval calculation part 53 calculates the transmission mean time interval based on the mean value calculated by the mean calculation part 51.

As described above, the propagation time interval of the sync signal is different each time. The propagation time interval of the main sync signal will be called main propagation time interval. The propagation time interval of the subordinate sync signal will be called subordinate propagation time interval. The mean value of the main propagation time interval will be called main propagation mean time interval. The mean value of the subordinate propagation time interval will be called subordinate propagation mean time interval. Assuming that the main propagation mean time interval and the subordinate propagation mean time interval are equal, the main propagation mean time interval and the subordinate propagation mean time interval are equal to the propagation mean time interval.

The reference time point calculation part 54 calculates the reference time point. For example, the reference time point calculation part 54 calculates the reference time point based on the mean value calculated by the mean calculation part 51 and the propagation mean time interval calculated by the propagation mean time interval calculation part 53.

The correction parameter notification part 55 notifies the subordinate device 13 of the correction parameter. The correction parameter of which the subordinate device 13 is notified by the correction parameter notification part 55 includes the speed ratio calculated by the speed ratio calculation part 52 and the reference time point calculated by the reference time point calculation part 54.

Figure 6:
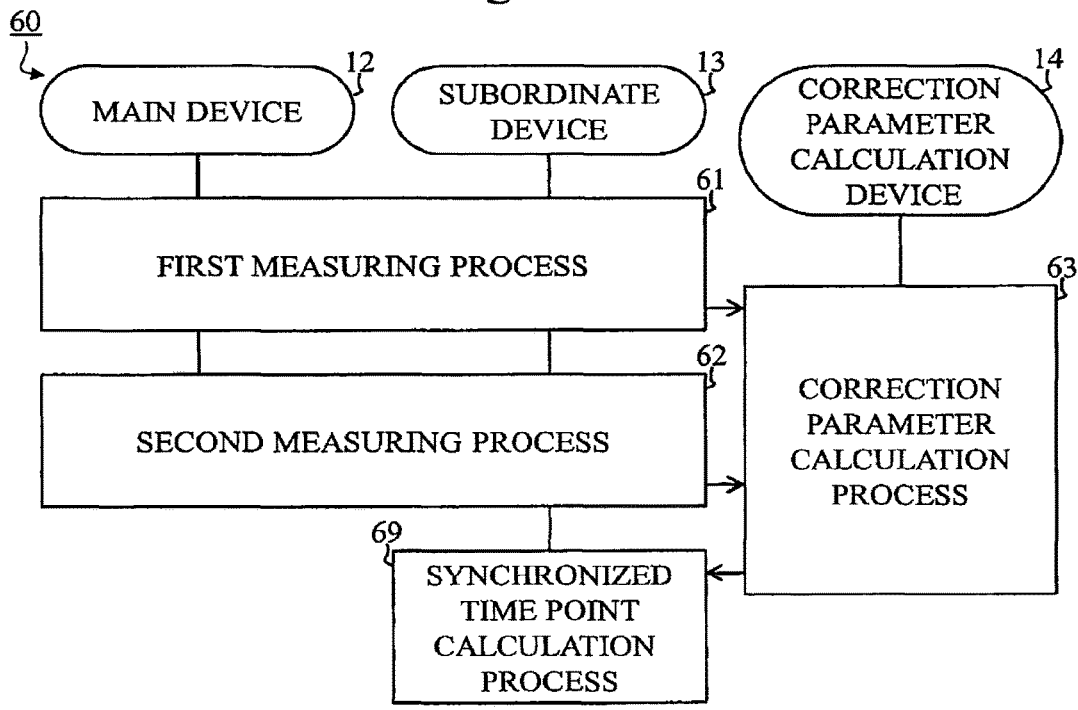
FIG. 6 shows an example of the flow of a time point synchronization process 60 according to Embodiment 1.

FIG. 6 shows an example of the flow of a time point synchronization process 60 according to this embodiment.

In the time point synchronization process 60, the main device 12 and subordinate device 13 transmit/receive the sync signals and measure the respective transmission/reception time points. Based on the measured time points, the correction parameter calculation device 14 calculates the correction parameter. Based on the calculated correction parameter, the subordinate device 13 corrects the subordinate time point, thereby calculating the time point synchronized with the main time point.

For example, the time point synchronization process 60 has a first measuring process 61, a second measuring process 62, a correction parameter calculation process 63, and a sync time point calculation process 69.

In the first measuring process 61, the main device 12 and subordinate device 13 transmit/receive the sync signals a plurality of times and measure the respective transmission/reception time points.

In the second measuring process 62, the main device 12 and subordinate device 13 transmit/receive the sync signals a plurality of times again and measure the respective transmission/reception time points.

In the correction parameter calculation process 63, the correction parameter calculation device 14 calculates the correction parameter based on the time points measured by the main device 12 and subordinate device 13 in the first measuring process 61 and second measuring process 62.

In the sync time point calculation process 69, the subordinate device 13 corrects the subordinate time point based on the correction parameter calculated by the correction parameter calculation device 14 in the correction parameter calculation process 63, thereby calculating the corrected time point.

The second measuring process 62 may be executed immediately after the first measuring process 61 is ended, or at an interval from the end of the first measuring process 61.

The sync time point calculation process 69 may be executed immediately after the correction parameter calculation process 63 is ended, or at an interval from the end of the correction parameter calculation process 63. The sync time point calculation process 69 is repeatedly executed every time a time point synchronized with the main time point is required.

The time point synchronization process 60 is executed repeatedly. The repetition may take place regularly, for example, once a day, or irregularly as needed, for example, when highly accurate synchronization is required.

In the time point synchronization process 60 of the second time and onwards, the time point measured in first measuring process 61 or second measuring process 62 of the time point synchronization process 60 executed previously may be utilized.

For example, assume that the transmission time points and reception time points of n of main sync signals and n of subordinate sync signals are to be measured in the first measuring process 61. Note that n is an integer of 2 or more. In the time point synchronization process 60 of the first time, the main sync signal and subordinate sync signal are transmitted/received n times in the first measuring process 61. In the time point synchronization process 60 of the second time and onwards, the main sync signal and subordinate sync signal are transmitted/received k times in the first measuring process 61. Note that k is an integer of n/2 or more and less than n. The correction parameter calculation device 14 calculates the correction parameter based on the main transmission time points, subordinate reception time points, subordinate transmission time points, and main reception time points for the k times of transmission/reception which are measured in the first measuring process 61 of the time point synchronization process 60 of this time, as well as the main transmission time points, subordinate reception time points, subordinate transmission time points, and main reception time points for the (n−k) times which are measured in the first measuring process 61 of the time point synchronization process 60 of the last time.

If k is less than n/2, then in the time point synchronization process of the third time and onwards, the time points for the k times which are measured in the first measuring process 61 of the time point synchronization process 60 of this time and the time points for the k times which are measured in the first measuring process 61 of the time point synchronization process 60 of the last time do not make time points for the n times. The correction parameter calculation device 14 calculates the correction parameter using the time points measured in the first measuring process 61 of the time point synchronization process 60 of the further preceding measurements.

For example, if k is 1, in the time point synchronization process 60 of the ith time (i is an integer of 2 or more and less than n), the correction parameter calculation device 14 calculates the correction parameter based on the time points for the (i−1) times which are measured in the first measuring processes 61 of time point synchronization processes 60 for the second to ith time and the time points for the (n−i) times which are measured in the first measuring process 61 of the time point synchronization process 60 of the first time. In the time point synchronization process 60 of the ith time (i is an integer of n or more), the correction parameter calculation device 14 calculates the correction parameter based on the time points for the n times which are measured in the first measuring processes 61 of the time point synchronization processes 60 for the (i−n+1)th to ith times.

Figure 7:
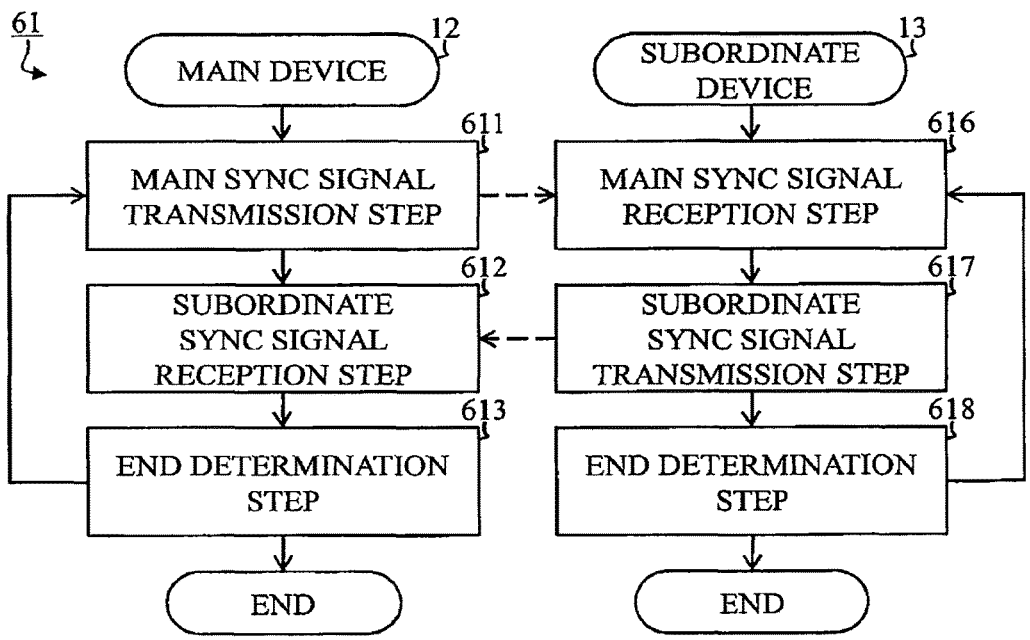
FIG. 7 shows an example of the flow of a first measuring process 61 according to Embodiment 1.

FIG. 7 shows an example of the flow of first measuring process 61 according to this embodiment.

The first measuring process 61 has, for example, a main sync signal transmission step 611, a subordinate sync signal reception step 612, an end determination step 613, a main sync signal reception step 616, a subordinate sync signal transmission step 617, and an end determination step 618.

In the main sync signal transmission step 611, the main device 12 (main transmission part 22) transmits the main sync signal to the subordinate device 13. Using the main clock device 21, the main device 12 (main transmission time point measuring part 23) measures the time point at which it has transmitted the main sync signal. The main device 12 (main transmission time point notification part 24) notifies the correction parameter calculation device 14 of the main transmission time point that was measured.

In the main sync signal reception step 616, the subordinate device 13 (subordinate reception part 32) receives the main sync signal which was transmitted by the main device 12 in the main sync signal transmission step 611. Using the subordinate clock device 31, the subordinate device 13 (subordinate reception time point measuring part 33) measures the time point at which it has received the main sync signal. The subordinate device 13 (subordinate reception time point notification part 34) notifies the correction parameter calculation device 14 of the subordinate reception time point that was measured.

In the subordinate sync signal transmission step 617, the subordinate device 13 (subordinate transmission part 35) transmits the subordinate sync signal to the main device 12. Using the subordinate clock device 31, the subordinate device 13 (subordinate transmission time point measuring part 36) measures the time point at which it has transmitted the subordinate sync signal. The subordinate device 13 (subordinate transmission time point notification part 37) notifies the correction parameter calculation device 14 of the subordinate transmission time point that was measured.

In the subordinate sync signal reception step 612, the main device 12 (main reception part 25) receives the subordinate sync signal which was transmitted by the subordinate device 13 in the subordinate sync signal transmission step 617. Using the main clock device 21, the main device 12 (main reception time point measuring part 26) measures the time point at which it has received the subordinate sync signal. The main device 12 (main reception time point notification part 27) notifies the correction parameter calculation device 14 of the main reception time point that was measured.

In the end determination step 613, the main device 12 (main transmission part 22) determines whether or not to end the first measuring process 61. For example, the number of times the main device 12 transmits the main sync signal is determined in advance. This number of times is defined as $n_1$. Note that $n_1$ is an integer of 2 or more. When the number of times the main sync signal transmission step 611 is executed reaches $n_1$, the main device 12 determines to end the first measuring process 61.

If it is determined that the first measuring process 61 is not to be ended yet, the main device 12 reverses the process to the main sync signal transmission step 611, and transmits the next main sync signal.

If it is determined that the first measuring process 61 is to be ended, the main device 12 ends the first measuring process 61.

In the end determination step 618, the subordinate device 13 (subordinate reception part 32) determines whether or not to end the first measuring process 61. The determination method must be such that the determination result coincides with the determination result made by the main device 12 in the end determination step 613. For example, when the number of times the subordinate sync signal transmission step 617 is executed reaches $n_1$, the subordinate device 13 determines to end the first measuring process 61. Alternatively, if the subordinate device 13 does not receive the main sync signal from the main device 12 even at the lapse of a predetermined period of time, subordinate device 13 considers that the main device 12 has ended the first measuring process 61, and determines to the end first measuring process 61.

If it is determined that the first measuring process 61 is not to be ended yet, the subordinate device 13 reverses the process to the main sync signal reception step 616, and receives the next main sync signal.

If it is determined that the first measuring process 61 is to be ended, the subordinate device 13 ends the first measuring process 61.

The main device 12 and subordinate device 13 need not notify the correction parameter calculation device 14 of the measured time point immediately after the time point is measured, but may notify collectively later on after it is determined that the first measuring process 61 is to be ended.

Figure 8:
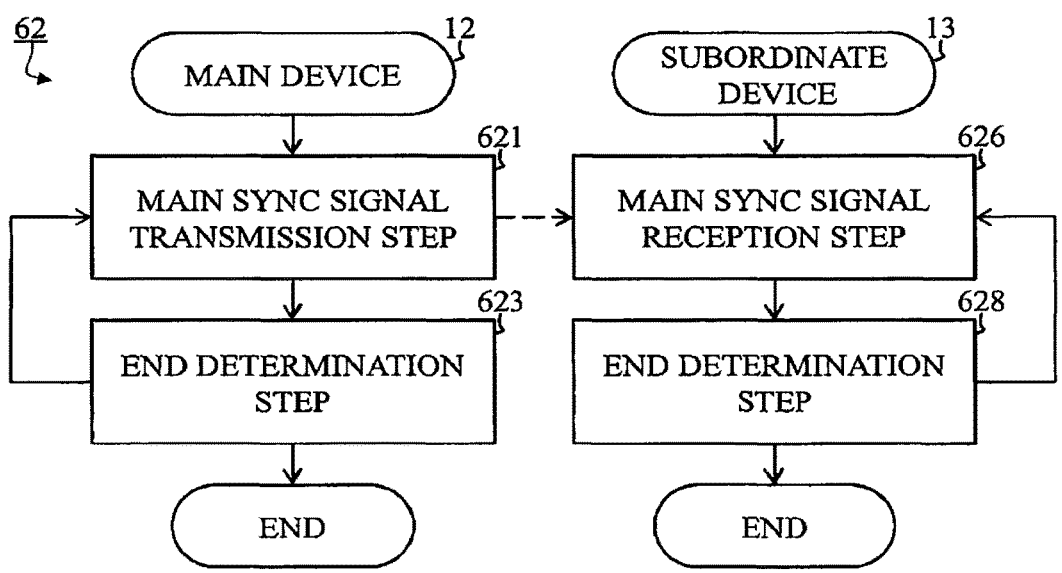
FIG. 8 shows an example of the flow of a second measuring process 62 according to Embodiment 1.

FIG. 8 shows an example of the flow of the second measuring process 62 according to this embodiment.

The second measuring process 62 has, for example, a main sync signal transmission step 621, an end determination step 623, a main sync signal reception step 626, and an end determination step 628.

In the main sync signal transmission step 621, the main device 12 (main transmission part 22) transmits the main sync signal to the subordinate device 13. Using the main clock device 21, the main device 12 (main transmission time point measuring part 23) measures the time point at which it has transmitted the main sync signal. The main device 12 (main transmission time point notification part 24) notifies the correction parameter calculation device 14 of the main transmission time point that was measured.

In the main sync signal reception step 626, the subordinate device 13 (subordinate reception part 32) receives the main sync signal which was transmitted by the main device 12 in the main sync signal transmission step 611. Using the subordinate clock device 31, the subordinate device 13 (subordinate reception time point measuring part 33) measures the time point at which it has received the main sync signal. The subordinate device 13 (subordinate reception time point notification part 34) notifies the correction parameter calculation device 14 of the subordinate reception time point that was measured.

In the end determination step 623, the main device 12 (main transmission part 22) determines whether or not to end the second measuring process 62. For example, the number of times the main device 12 transmits the main sync signal is determined in advance. This number of times is defined as $n_2$, $n_2$ being an integer of 2 or more. The number of times $n_2$ the main device 12 transmits the main sync signal in the second measuring process 62 may be equal to or different from the number of times $n_1$ the main device 12 transmits the main sync signal in the first measuring process 61. When the number of times the main sync signal transmission step 611 is executed reaches $n_2$, the main device 12 determines to end the first measuring process 61.

If it is determined that the second measuring process 62 is not to be ended yet, the main device 12 reverses the process to the main sync signal transmission step 621, and transmits the next main sync signal.

If it is determined that the second measuring process 62 is to be ended, the main device 12 ends the second measuring process 62.

In the end determination step 628, the subordinate device 13 (subordinate reception part 32) determines whether or not to end the second measuring process 62. The determination method must be such that the determination result coincides with the determination result made by the main device 12 in the end determination step 623.

If it is determined that the second measuring process 62 is not to be ended yet, the subordinate device 13 reverses the process to the main sync signal reception step 626, and receives the next main sync signal.

If it is determined that the second measuring process 62 is to be ended, the subordinate device 13 ends the second measuring process 62.

Figure 9:
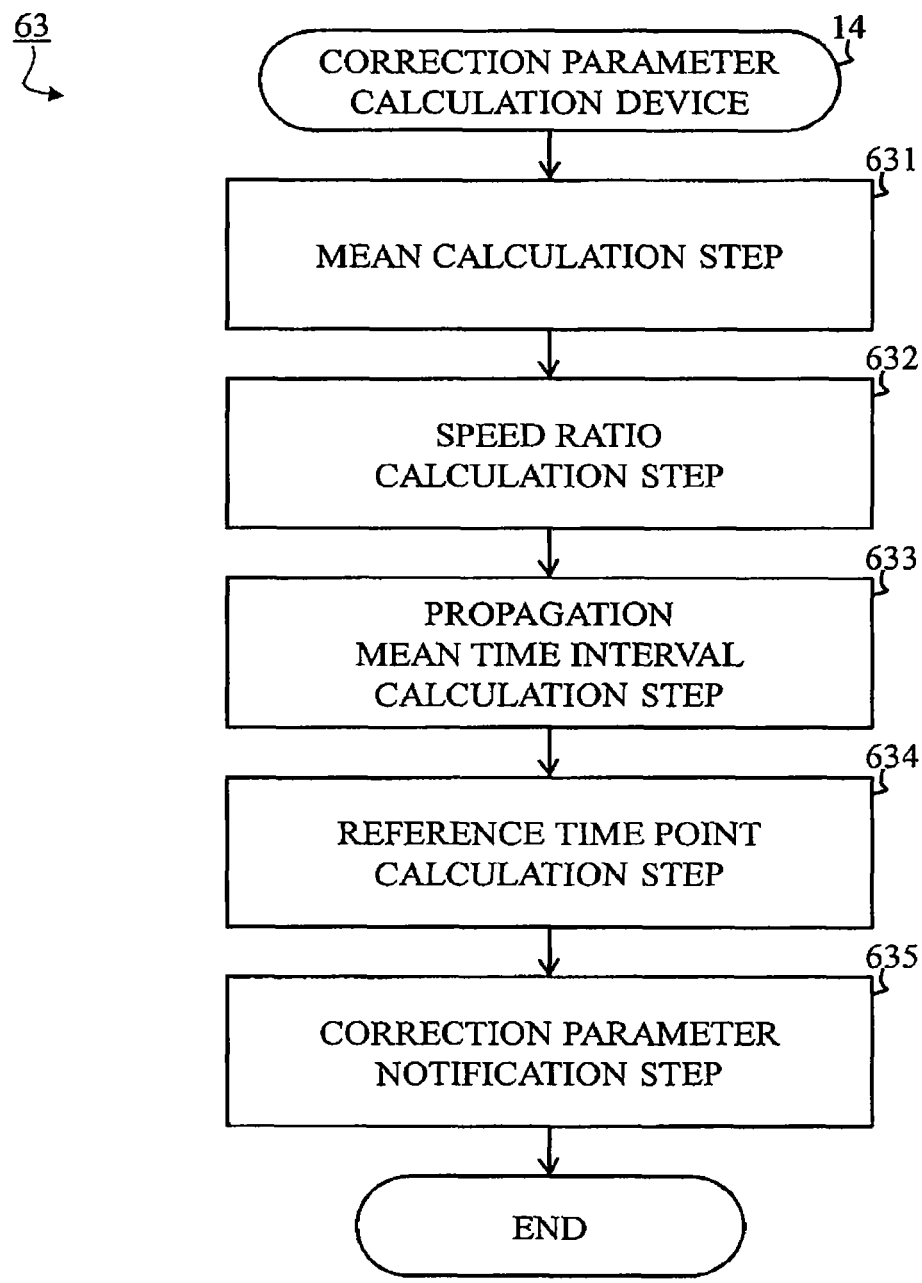
FIG. 9 shows an example of the flow of a correction parameter calculation process 63 according to Embodiment 1.

FIG. 9 shows an example of the flow of the correction parameter calculation process 63 according to this embodiment.

The correction parameter calculation process 63 has, for example, a mean calculation step 631, a speed ratio calculation step 632, a propagation mean time interval calculation step 633, a reference time point calculation step 634, and a correction parameter notification step 635.

In the mean calculation step 631, the correction parameter calculation device 14 (mean calculation part 51) calculates the first main transmission mean time point, the second main transmission mean time point, the first subordinate reception mean time point, the second subordinate reception mean time point, a subordinate transmission mean time point, and a main reception mean time point.

The first main transmission mean time point calculated by the correction parameter calculation device 14 is the mean value of the plurality of main transmission time points which were measured by the main device 12 in the first measuring process 61.

The second main transmission mean time point calculated by the correction parameter calculation device 14 is the mean value of the plurality of main transmission time points which were measured by the main device 12 in the second measuring process 62.

The first subordinate reception mean time point calculated by the correction parameter calculation device 14 is the mean value of the plurality of subordinate reception time points which were measured by the subordinate device 13 in the first measuring process 61.

The second subordinate reception mean time point calculated by the correction parameter calculation device 14 is the mean value of the plurality of subordinate reception time points which were measured by the subordinate device 13 in the second measuring process 62.

The subordinate transmission mean time point calculated by the correction parameter calculation device 14 is the mean value of the plurality of subordinate transmission time points which were measured by the subordinate device 13 in first measuring process 61.

The main reception mean time point calculated by the correction parameter calculation device 14 is the mean value of the plurality of main reception time points which were measured by the main device 12 in the first measuring process 61.

In the speed ratio calculation step 632, the correction parameter calculation device 14 (speed ratio calculation part 52) calculates the speed ratio. For example, the correction parameter calculation device 14 calculates, as the speed ratio, the quotient obtained by dividing a difference obtained by subtracting the first main transmission mean time point calculated in the mean calculation step 631 from the second main transmission mean time point calculated in the mean calculation step 631, by a difference obtained by subtracting the first subordinate reception mean time point calculated in the mean calculation step 631 from the second subordinate reception mean time point calculated in the mean calculation step 631.

In the propagation mean time interval calculation step 633, the correction parameter calculation device 14 (propagation mean time interval calculation part 53) calculates the propagation mean time interval. For example, the correction parameter calculation device 14 calculates the difference of subtracting the first main transmission mean time point calculated in the mean calculation step 631, from the main reception mean time point calculated in the mean calculation step 631. The calculated difference will be called "main transmission/reception mean time point difference". The correction parameter calculation device 14 calculates the difference obtained by subtracting the first subordinate reception mean time point calculated in the mean calculation step 631, from the subordinate transmission mean time point calculated in the mean calculation step 631. The calculated difference will be called "subordinate reception/transmission mean time point difference". The correction parameter calculation device 14 calculates, as a propagation mean time interval, the quotient obtained by dividing by 2 a difference obtained by subtracting the subordinate reception/transmission mean time point difference from the main transmission/reception mean time point difference.

In the reference time point calculation step 634, the correction parameter calculation device 14 (reference time point calculation part 54) calculates a main reference time point and a subordinate reference time point. For example, the correction parameter calculation device 14 takes the first subordinate reception mean time point calculated in the mean calculation step 631, as a subordinate reference time point. The correction parameter calculation device 14 calculates, as a main reference time point, the sum of the first main transmission mean time point calculated in the mean calculation step 631 and the propagation mean time interval calculated in the propagation mean time interval calculation step 633.

In the correction parameter notification step 635, the correction parameter calculation device 14 (correction parameter notification part 55) notifies the subordinate device 13 of the correction parameter. For example, the correction parameter calculation device 14 notifies the subordinate device 13 of the speed ratio calculated in the speed ratio calculation step 632 and the main reference time point and subordinate reference time point which are calculated in the reference time point calculation step 634.

Figure 10:
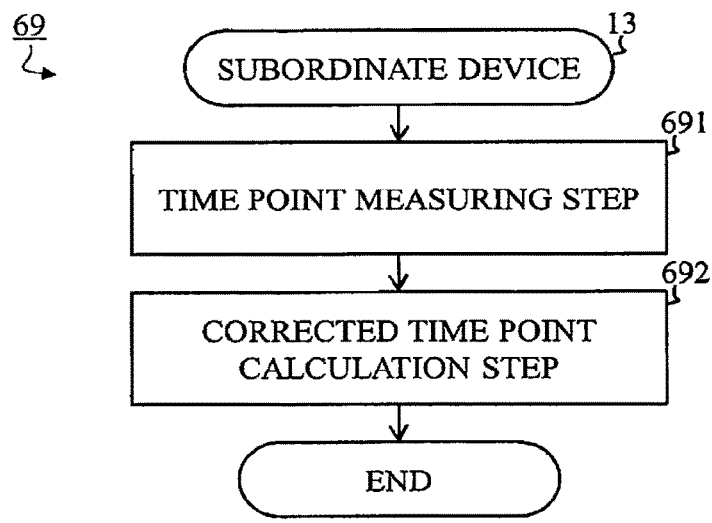
FIG. 10 shows an example of the flow of a synchronized time point calculation process 69 according to Embodiment 1.

FIG. 10 shows an example of the flow of the synchronized time point calculation process 69 according to this embodiment.

The synchronized time point calculation process 69 has, for example, a time point measuring step 691 and a corrected time point calculation step 692.

In the time point measuring step 691, the subordinate device 13 (synchronized time point calculation part 39) measures the time point using the subordinate clock device 31.

In the corrected time point calculation step 692, the subordinate device 13 (synchronized time point calculation part 39) corrects the subordinate time point measured in the time point measuring step 691, thus calculating a corrected time point. For example, the subordinate device 13 calculates the difference of subtracting the subordinate reference time point calculated by the correction parameter calculation device 14 in the correction parameter calculation process 63, from the subordinate time point measured in the time point measuring step 691. The subordinate device 13 calculates the product obtained by multiplying the calculated difference by the speed ratio calculated by the correction parameter calculation device 14 in the correction parameter calculation process 63. The subordinate device 13 calculates, as the corrected time point, the sum of the calculated product and the main reference time point which is calculated by the correction parameter calculation device 14 in the correction parameter calculation process 63.

If the correction parameter calculated by the correction parameter calculation device 14 is accurate, the corrected time point calculated by the subordinate device 13 coincides with the main time point of the main clock device 21.

Figure 11:
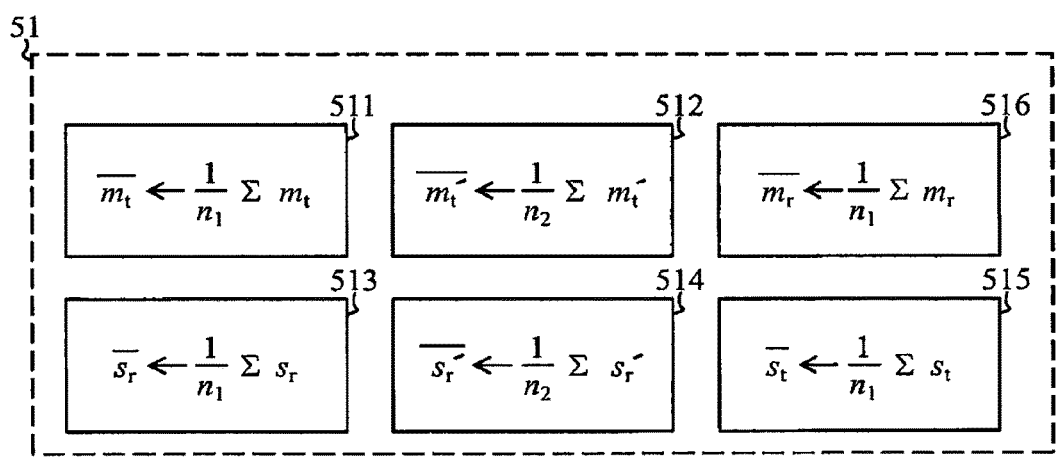
FIG. 11 shows an example of the configuration of the detailed blocks of a mean calculation part 51 according to Embodiment 1.

FIG. 11 shows an example of the configuration of the detailed blocks of the mean calculation part 51 according to this embodiment.

The mean calculation part 51 has, for example, two main transmission mean time point calculation parts 511 and 512, two subordinate reception mean time point calculation parts 513 and 514, a subordinate transmission mean time point calculation part 515, and a main reception mean time point calculation part 516.

The main transmission mean time point calculation part 511 calculates the first main transmission mean time point. For example, where the number of main transmission time points $m_t$ measured by the main device 12 in the first measuring process 61 is $n_1$, the main transmission mean time point calculation part 511 calculates the sum of $n_1$ of main transmission time points $m_t$. The main transmission mean time point calculation part 511 calculates, as the first main transmission mean time point, the quotient obtained by dividing the calculated sum by $n_1$.

The main transmission mean time point calculation part 512 calculates the second main transmission mean time point. For example, where the number of main transmission time points $m_t'$ measured by the main device 12 in the second measuring process 62 is $n_2$, the main transmission mean time point calculation part 512 calculates the sum of $n_2$ of main transmission time points $m_t'$. The main transmission mean time point calculation part 512 calculates, as the second main transmission mean time point, the quotient obtained by dividing the calculated sum by $n_2$.

The subordinate reception mean time point calculation part 513 calculates the first subordinate reception mean time point. For example, where the number of subordinate reception time points $s_r$ measured by the subordinate device 13 in the first measuring process 61 is $n_1$, the subordinate reception mean time point calculation part 513 calculates the sum of $n_1$ of subordinate reception time points $s_r$. The subordinate reception mean time point calculation part 513 calculates, as the first subordinate reception mean time point, the quotient obtained by dividing the calculated sum by $n_1$.

The subordinate reception mean time point calculation part 514 calculates the second subordinate reception mean time point. For example, where the number of subordinate reception time points $s_r'$ measured by the subordinate device 13 in the second measuring process 62 is $n_2$, the subordinate reception mean time point calculation part 514 calculates the sum of $n_2$ of subordinate reception time points $s_r'$. The subordinate reception mean time point calculation part 514 calculates, as the second subordinate reception mean time point, the quotient obtained by dividing the calculated sum by $n_2$.

The subordinate transmission mean time point calculation part 515 calculates the subordinate transmission mean time point. For example, where the number of subordinate transmission time points $s_t$ measured by the subordinate device 13 in the first measuring process 61 is $n_1$, the subordinate transmission mean time point calculation part 515 calculates the sum of $n_1$ of subordinate transmission time points $s_t$. The subordinate transmission mean time point calculation part 515 calculates, as the subordinate transmission mean time point, the quotient obtained by dividing the calculated sum by $n_1$.

The main reception mean time point calculation part 516 calculates the main reception mean time point. For example, where the number of main reception time points $m_r$ measured by the main device 12 in the first measuring process 61 is $n_1$, the main reception mean time point calculation part 516 calculates the sum of $n_1$ of main reception time points $m_r$. The main reception mean time point calculation part 516 calculates, as the main reception mean time point, the quotient obtained by dividing the sum by $n_1$.

Figure 12:
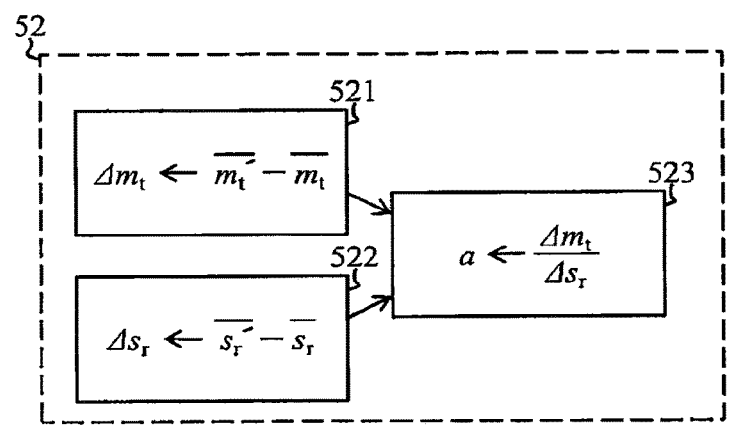
FIG. 12 shows an example of the configuration of the detailed blocks of a speed ratio calculation part 52 according to Embodiment 1.

FIG. 12 shows an example of the configuration of the detailed blocks of the speed ratio calculation part 52 according to this embodiment.

The speed ratio calculation part 52 has, for example, a main transmission time point difference calculation part 521, a subordinate reception time point difference calculation part 522, and a quotient calculation part 523.

The main transmission time point difference calculation part 521 calculates a main transmission time point difference $\Delta m_t$. The main transmission time point difference $\Delta m_t$ is the difference obtained by subtracting the first main transmission mean time point calculated by the main transmission mean time point calculation part 511, from the second main transmission mean time point calculated by the main transmission mean time point calculation part 512.

The subordinate reception time point difference calculation part 522 calculates a subordinate reception time point difference $\Delta s_r$. The subordinate reception time point difference $\Delta s_r$ is the difference obtained by subtracting the first subordinate reception mean time point calculated by the subordinate reception mean time point calculation part 513 from the second subordinate reception mean time point calculated by the subordinate reception mean time point calculation part 514.

The quotient calculation part 523 calculates, as a speed ratio a, the quotient obtained by dividing the main transmission time point difference $\Delta m_t$ calculated by the main transmission time point difference calculation part 521, by the subordinate reception time point difference $\Delta s_r$ calculated by the subordinate reception time point difference calculation part 522.

Assume that the main propagation mean time interval in the second measuring process 62 is equal to the main propagation mean time interval in the first measuring process 61. Then, the time interval from the first main transmission mean time point to the second main transmission mean time point and the time interval from the first subordinate reception mean time point to the second subordinate reception mean time point are equal. The main transmission time point difference $\Delta m_t$ is obtained by measuring this time interval using the main clock device 21. The subordinate reception time point difference $\Delta s_r$ is obtained by measuring this time interval using the subordinate clock device 31. Hence, the quotient calculated by the quotient calculation part 523 coincides with the speed ratio.

The variance of the main transmission propagation mean time interval obtained by averaging n of main propagation time intervals being samples, is 1/n the variance of the main propagation time interval being a universe. The variance of the difference between the main propagation mean time interval obtained by averaging $n_1$ of main propagation time intervals being samples, and the main propagation mean time interval obtained by averaging $n_2$ of main propagation time intervals being samples, is $(1/n_1+1/n_2)$ times the variance of the main propagation time interval being the universe.

Hence, if $n_1$ and $n_2$ are sufficiently large, it can be assumed that the main propagation mean time interval in the second measuring process 62 is equal to the main propagation mean time interval in the first measuring process 61.

Figure 13:
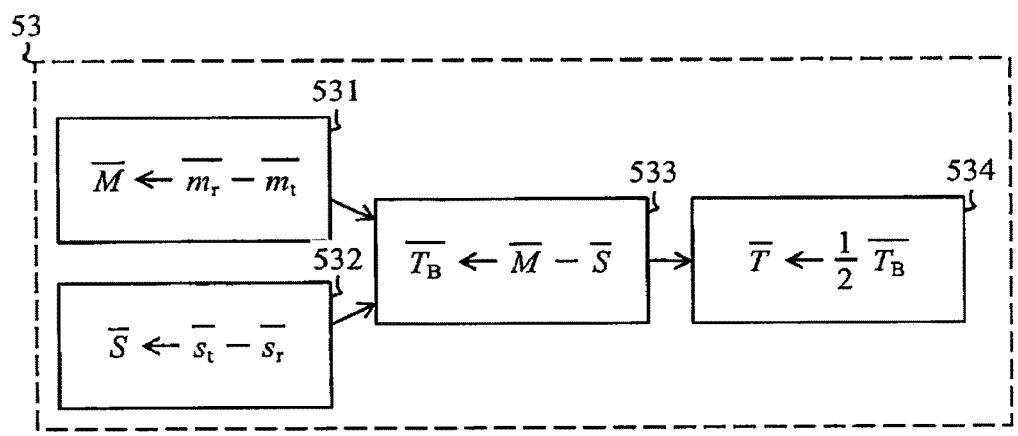
FIG. 13 shows an example of the configuration of the detailed blocks of a propagation mean time interval calculation part 53 according to Embodiment 1.

FIG. 13 shows an example of the configuration of the detailed blocks of the propagation mean time interval calculation part 53 according to this embodiment.

The propagation mean time interval calculation part 53 has, for example, a main transmission/reception mean time point difference calculation part 531, a subordinate reception/transmission mean time point difference calculation part 532, a round-trip propagation mean time interval calculation part 533, and a single-way propagation mean time interval calculation part 534.

The main transmission/reception mean time point difference calculation part 531 calculates the main transmission/reception mean time point difference. For example, the main transmission/reception mean time point difference calculation part 531 calculates, as the main transmission/reception mean time point difference, the difference obtained by subtracting the first main transmission mean time point calculated by the main transmission mean time point calculation part 511, from the main reception mean time point calculated by the main reception mean time point calculation part 516.

The subordinate reception/transmission mean time point difference calculation part 532 calculates the subordinate transmission/reception time point difference. For example, the subordinate reception/transmission mean time point difference calculation part 532 calculates, as the subordinate reception/transmission mean time point difference, the difference obtained by subtracting the first subordinate reception mean time point calculated by the subordinate reception mean time point calculation part 513, from the subordinate transmission mean time point calculated by the subordinate transmission mean time point calculation part 515.

The round-trip propagation mean time interval calculation part 533 calculates the round-trip propagation mean time interval. The round-trip propagation mean time interval is the sum of the main propagation mean time interval and the subordinate propagation mean time interval. For example, the round-trip propagation mean time interval calculation part 533 calculates, as the round-trip propagation mean time interval, the difference obtained by subtracting the subordinate reception/transmission mean time point difference calculated by the subordinate reception/transmission mean time point difference calculation part 532, from the main transmission/reception mean time point difference calculated by the main transmission/reception mean time point difference calculation part 531.

The single-way propagation mean time interval calculation part 534 calculates, as the propagation mean time interval, the quotient obtained by dividing by 2 the round-trip propagation mean time interval calculated by the round-trip propagation mean time interval calculation part 533.

The elapsed time interval since the main device 12 transmits the main sync signal in the main sync signal transmission step 611 until the main device 12 receives the subordinate sync signal in the subordinate sync signal reception step 612 will be called "main transmission/reception time point difference".

The elapsed time interval since the subordinate device 13 receives the main sync signal in the main sync signal reception step 616 until the subordinate device 13 transmits the subordinate sync signal in the subordinate sync signal transmission step 617 will be called "subordinate reception/transmission time point difference".

$$M = m_r - m_t$$

$$S = s_t - s_r$$

Note that M represents the main transmission/reception time point difference based on the time point of the main clock device 21; $m_r$ represents the main reception time point; $m_t$ represents the main transmission time point; S represents the subordinate reception/transmission time point difference based on the time point of the subordinate clock device 31; $s_t$ represents the subordinate transmission time point; and $s_r$ represents the subordinate reception time point.

The sum of the main propagation time interval being a time interval since the main device 12 transmits the main sync signal in the main sync signal transmission step 611 until the subordinate device 13 receives the main sync signal in the main sync signal reception step 616, and the subordinate propagation time interval being a time interval since the subordinate device 13 transmits the subordinate sync signal in the subordinate sync signal transmission step 617 until the main device 12 receives the subordinate sync signal in the subordinate sync signal reception step 612 will be called "round-trip propagation time interval".

The round-trip propagation time interval is equal to the difference of subtracting the subordinate reception/transmission time point difference from the main transmission/reception time point difference. The reception/transmission time point difference based on the time point of the main clock device 21 is equal to the product obtained by multiplying, by the speed ratio a, the reception/transmission time point difference S based on the time point of the subordinate clock device 31. Accordingly, $$T_B = M - a \cdot S$$

Note that $T_B$ represents the round-trip propagation time interval based on the time point of the main clock device 21; M represents the main transmission/reception time point difference based on the time point of the main clock device 21; a represents the speed ratio; and S represents the subordinate reception/transmission time point difference based on the time point of the subordinate clock device 31.

The subordinate transmission/reception time point difference is small as compared to the main transmission/reception time point difference. Also, the speed ratio a is almost 1. Hence, $$T_B \approx M - S$$

In the first measuring process 61, assuming that transmission/reception of the main sync signal and subordinate sync signal is repeated n times, then n of round-trip two-way propagation time is calculated. When n of round-trip propagation time intervals are added up, $$\Sigma T_B \approx \Sigma (M - S) = \Sigma M - \Sigma S$$

is established.

$\Sigma T_B$ divided by n is the round-trip propagation mean time interval. Hence, the round-trip propagation mean time interval is equal to the difference of subtracting the subordinate reception/transmission mean time point difference from the main transmission/reception mean time point difference.

Figure 14:
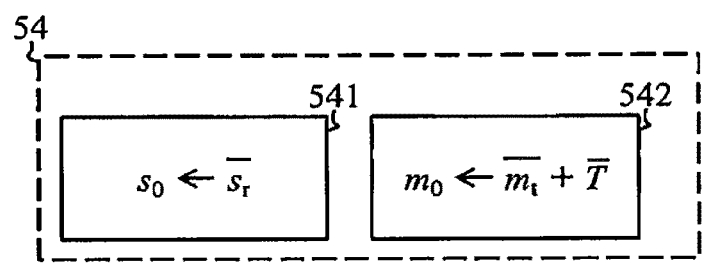
FIG. 14 shows an example of the configuration of the detailed blocks of a reference time point calculation part 54 according to Embodiment 1.

FIG. 14 shows an example of the configuration of the detailed blocks of the reference time point calculation part 54 according to this embodiment.

The reference time point calculation part 54 has, for example, a subordinate reference time point calculation part 541 and a main reference time point calculation part 542.

The subordinate reference time point calculation part 541 calculates a subordinate reference time point $s_0$. For example, the subordinate reference time point calculation part 541 takes the first subordinate reception mean time point calculated by the subordinate reception mean time point calculation part 513, as the subordinate reference time point $s_0$.

The main reference time point calculation part 542 calculates a main reference time point $m_0$. For example, the main reference time point calculation part 542 calculates, as the main reference time point $m_0$, the sum of the first main transmission mean time point calculated by the main transmission mean time point calculation part 511 and the propagation mean time interval calculated by the propagation mean time interval calculation part 53.

The time point of the main clock device 21 where the subordinate device 13 receives the main sync signal in the main sync signal reception step 616 is $$t_{sr} = m_t + T_m$$

Note that $t_{sr}$ represents the time point of the main clock device 21 where the subordinate device 13 receives the main sync signal in the main sync signal reception step 616; $m_t$ represents the main transmission time point at which the main device 12 transmits the main sync signal in the main sync signal transmission step 611; and $T_m$ represents the main propagation time interval since the main device 12 transmits the main sync signal in the main sync signal transmission step 611 until the subordinate device 13 receives the main sync signal in the main sync signal reception step 616.

In the first measuring process 61, assuming that transmission/reception of the main sync signal is repeated n times, then $$\Sigma t_{sr} = \Sigma(m_t + T_m)$$
$$= \Sigma m_t + \Sigma T_m$$

When the two sides of this equation are divided by n, the left side corresponds to the time point of the main clock device 21 in the first subordinate reception mean time point. The right side is the sum of the first main transmission mean time point and the main propagation mean time interval.

Assuming that the main propagation mean time interval and the subordinate propagation mean time interval are equal, the main propagation mean time interval is equal to the propagation mean time interval. Hence, if the first subordinate reception mean time point is taken as the subordinate reference time point $s_0$, then the main reference time point $m_0$ is equal to the sum of the first transmission mean time point and the propagation mean time interval.

As the correction parameter calculation device 14 calculates the correction parameter in the above manner, it can calculate the correction parameter accurately even when the propagation time interval is not constant.

The subordinate device 13 calculates the corrected time point using the correction parameter described above, so the time point synchronized with the main time point can be obtained.

Embodiment 2

Embodiment 2 will be described with reference to FIGS. 15 to 19.

Portions that are identical to those in Embodiment 1 will be denoted by the same reference numerals as in Embodiment 1, and their explanation will be omitted.

Figure 15:
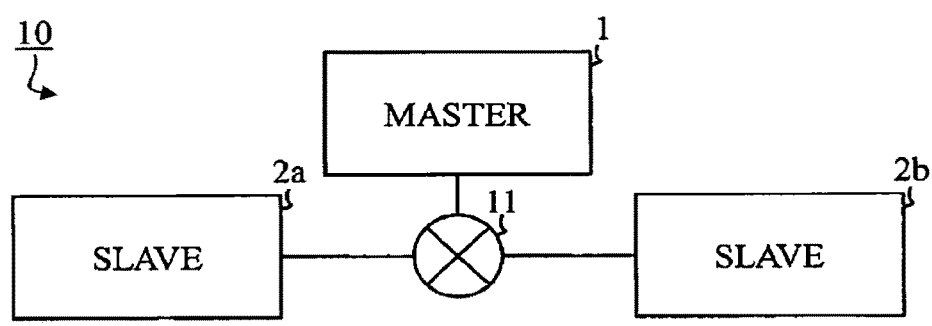
FIG. 15 shows an example of the overall configuration of a time point synchronization system 10 according to Embodiment 2.

FIG. 15 shows an example of the overall configuration of a time point synchronization system 10 according to this embodiment.

The time point synchronization system 10 has a master 1, a plurality of slaves 2a and 2b, and a network 11. Each of the slaves 2a and 2b may sometimes be simply referred to as "slave 2".

The master 1 is a device whose time point serves as the reference in the time point synchronization system 10.

The slave 2 is a device that generates time with a small difference from the time of the master 1 that serves as the reference time, based on the frame from the master 1.

The master 1 and the slave 2 communicate with each other via the network 11. There may be a plurality of slaves 2 in one network 11. There may be one or a plurality of relay stations between the master 1 and the slave 2. The relay station relays the communication between the master 1 and the slave 2.

Figure 16:
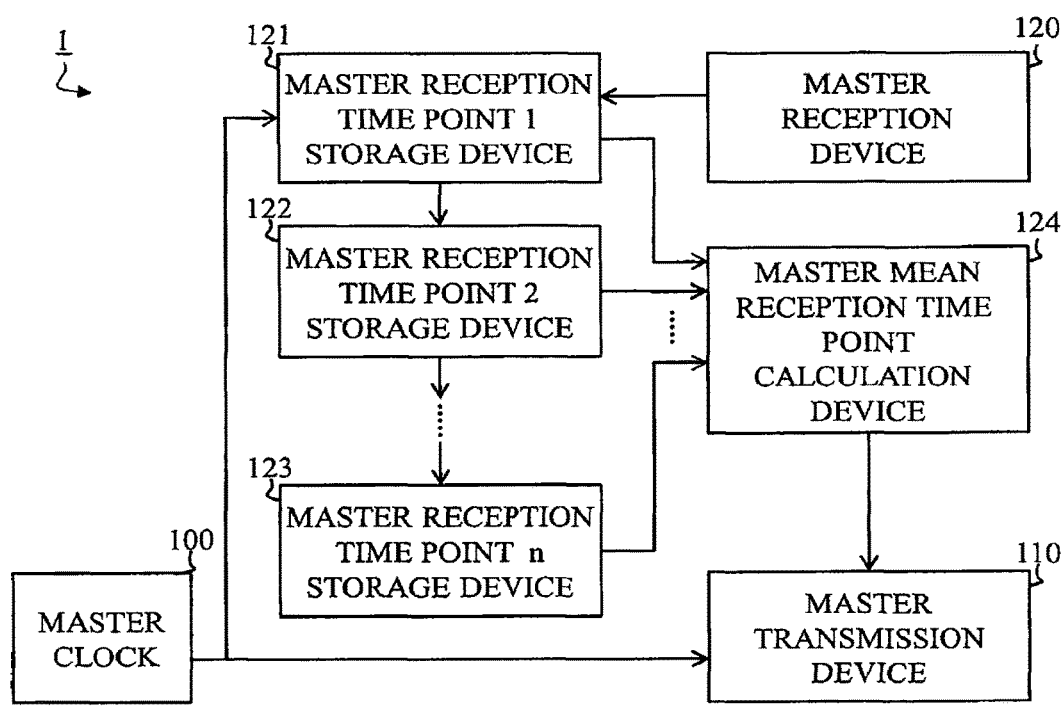
FIG. 16 shows an example of the configuration of the functional blocks of a master 1 according to Embodiment 2.

FIG. 16 shows an example of the configuration of the functional blocks of the master 1 according to this embodiment.

The master 1 has a master clock 100, a master transmission device 110, a master reception device 120, n of master reception time point i storage devices 121 to 123 (i is an integer of 1 or more to n or less), and a master mean reception time point calculation device 124.

The master clock 100 counts the time point serving as the reference in the time point synchronization system 10.

The master transmission device 110 transmits a frame to the slave 2. The frame to be transmitted by the master transmission device 110 contains the frame number, the transmission time point at which the frame is transmitted, a mean reception time point obtained by averaging the reception time points of the frames received by the master reception device 120, and the like.

The master reception device 120 receives the frame transmitted by the slave 2. The master reception device 120 notifies the master reception time point 1 storage device 121 that the frame is received.

The master reception time point i storage devices 121 to 123 store the reception time points of the frames received by the master reception device 120. The master reception time point 1 storage device 121 stores the reception time point of the frame received last time. The master reception time point 2 storage device 122 stores the reception time point of the frame received two times ago. The master reception time point n storage device 123 stores the reception time point of the frame received N times ago.

The master mean reception time point calculation device 124 calculates the mean reception time point (main reception time point) being the mean of the reception time points of the n of frames that the master reception device 120 received n times in the past.

The transmission time point contained in the frame transmitted by the master transmission device 110 and the reception time points stored in the master reception time point i storage devices 121 to 123 are measured using the master clock 100.

Figure 17:
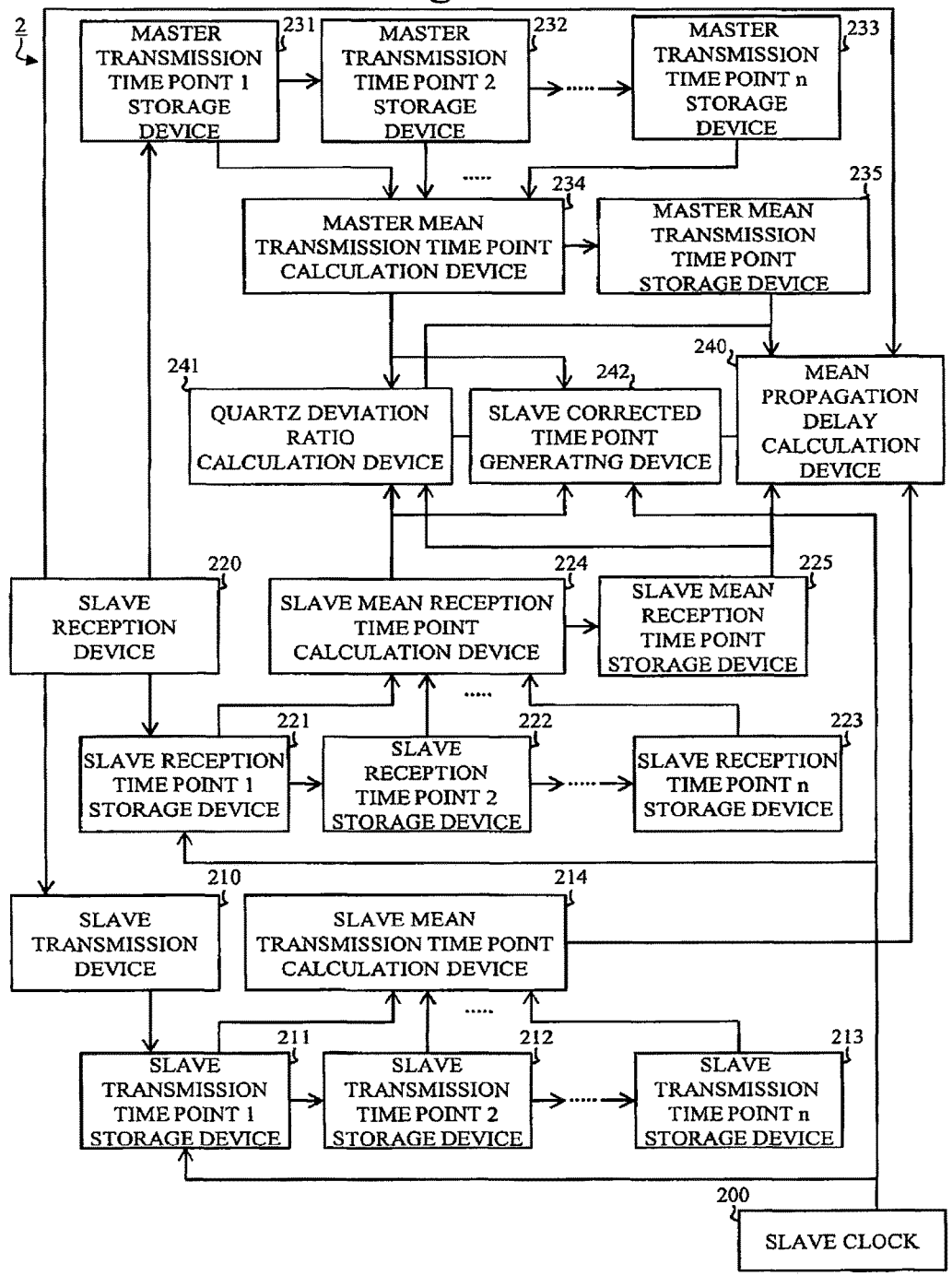
FIG. 17 shows an example of the configuration of the functional blocks of a slave 2 according to Embodiment 2.

FIG. 17 shows an example of the configuration of the functional blocks of the slave 2 according to this embodiment.

The slave 2 has a slave clock 200, a slave transmission device 210, n of slave transmission time point i storage devices 211 to 213 (i is an integer of 1 or more to n or less), a slave mean transmission time point calculation device 214, a slave reception device 220, n of slave reception time point i storage devices 221 to 223 (i is an integer of 1 or more to n or less), a slave mean reception time point calculation device 224, a slave mean reception time point storage device 225, n of master transmission time point i storage devices 231 to 233 (i is an integer of 1 or more to n or less), a master mean transmission time point calculation device 234, a master mean transmission time point storage device 235, a mean propagation delay calculation device 240, a quartz deviation ratio calculation device 241, and a slave corrected time point generating device 242.

The time deviation between the slave clock 200 and the master clock 100 is measured, and the slave clock 200 counts the time being source of correction.

The slave transmission device 210 transmits the frame to the master 1. The frame to be transmitted by the slave transmission device 210 contains a frame number and the like.

The slave transmission time point i storage devices 211 to 213 store the transmission time points of the frames transmitted by the slave transmission device 210. The slave transmission time point 1 storage device 211 stores the transmission time point of the frame transmitted by the slave transmission device 210 last time. The slave transmission time point 2 storage device 212 stores the transmission time point of the frame transmitted by the slave transmission device 210 two times ago. The slave transmission time point n storage device 213 stores the transmission time point of the frame transmitted by the slave transmission device 210 N times ago.

The slave mean transmission time point calculation device 214 calculates the mean transmission time point (subordinate transmission mean time point) being the mean of the transmission time points of the frames that the slave transmission device 210 transmitted N times in the past. The mean transmission time point calculated by the slave mean transmission time point calculation device 214 will be called "slave mean transmission time point".

The slave reception device 220 receives the frame transmitted by the master 1. The slave reception device 220 notifies the slave transmission device 210 and the slave reception time point 1 storage device 221 that it has received the frame.

The slave reception time point i storage devices 221 to 223 store the reception time points of the frames received by the slave reception device 220. The slave reception time point 1 storage device 221 stores the reception time point of the frame received by the slave reception device 220 last time. The slave reception time point 2 storage device 222 stores the reception time point of the frame received by the slave reception device 220 two times ago. The slave reception time point n storage device 223 stores the reception time point of the frame received by the slave reception device 220 n times ago.

The slave mean reception time point calculation device 224 calculates the mean reception time point (subordinate reception mean time point) being the mean of the reception time points of the frames that the slave reception device 220 received N times in the past. The mean reception time point calculated by the slave mean reception time point calculation device 224 will be called "slave mean reception time point".

The slave mean reception time point storage device 225 stores the slave mean reception time point.

The master transmission time point i storage devices 231 to 233 store the transmission time point contained in the frame received by the slave reception device 220. The master transmission time point 1 storage device 231 stores the transmission time point of the frame received by the slave reception device 220 last time. The master transmission time point 2 storage device 232 stores the transmission time point of the frame received by the slave reception device 220 two times ago. The master transmission time point n storage device 233 stores the transmission time point of the frame received by the slave reception device 220 n times ago.

The master mean transmission time point calculation device 234 calculates the mean transmission time point (main transmission mean time point) being the mean of the transmission time points of the frames that the slave reception device 220 received N times in the past. The mean transmission time point calculated by the master mean transmission time point calculation device 234 will be called "master mean transmission time point".

The master mean transmission time point storage device 235 stores the master mean transmission time point.

The mean propagation delay calculation device 240 calculates the mean propagation delay (propagation mean time interval).

The quartz deviation ratio calculation device 241 calculates a quartz deviation ratio (speed ratio).

The slave corrected time point generating device 242 generates the slave corrected time point which is estimated to be the reference time point, from the mean propagation delay and the quartz deviation ratio.

The transmission time points stored in the slave transmission time point i storage devices 211 to 213 and the reception time points stored in the slave reception time point i storage devices 221 to 223 have been measured using the slave clock 200.

In contrast to this, the transmission time points stored in the master transmission time point i storage devices 231 to 233 have been contained in the frame received by the slave reception device 220, and have accordingly been measured using the master clock 100.

The operation will now be described.

Two types of communications take place between the master 1 and the slave 2: namely, measuring communication and correcting communication.

The measuring communication is a communication aimed at measuring the mean propagation delay. The measuring communication is practiced prior to the correcting communication. In the measuring communication, a measuring frame is reciprocated N times between the master 1 and the slave 2.

The correcting communication is a communication aimed at practicing propagation delay correction and quartz deviation correction. Once the measuring communication is completed, the correcting communication is started. The correcting communication is practiced at a timing that requires time point synchronization. In the correcting communication, a correcting frame is transmitted from the master 1 to the slave 2. The time point synchronization of the slave is practiced by the correcting communication. After the correcting frame is received, the synchronization precision of the frame degrades gradually. Therefore, the transmission timing of the correcting frame is determined in accordance with the synchronization precision required of by each application.

Figure 18:
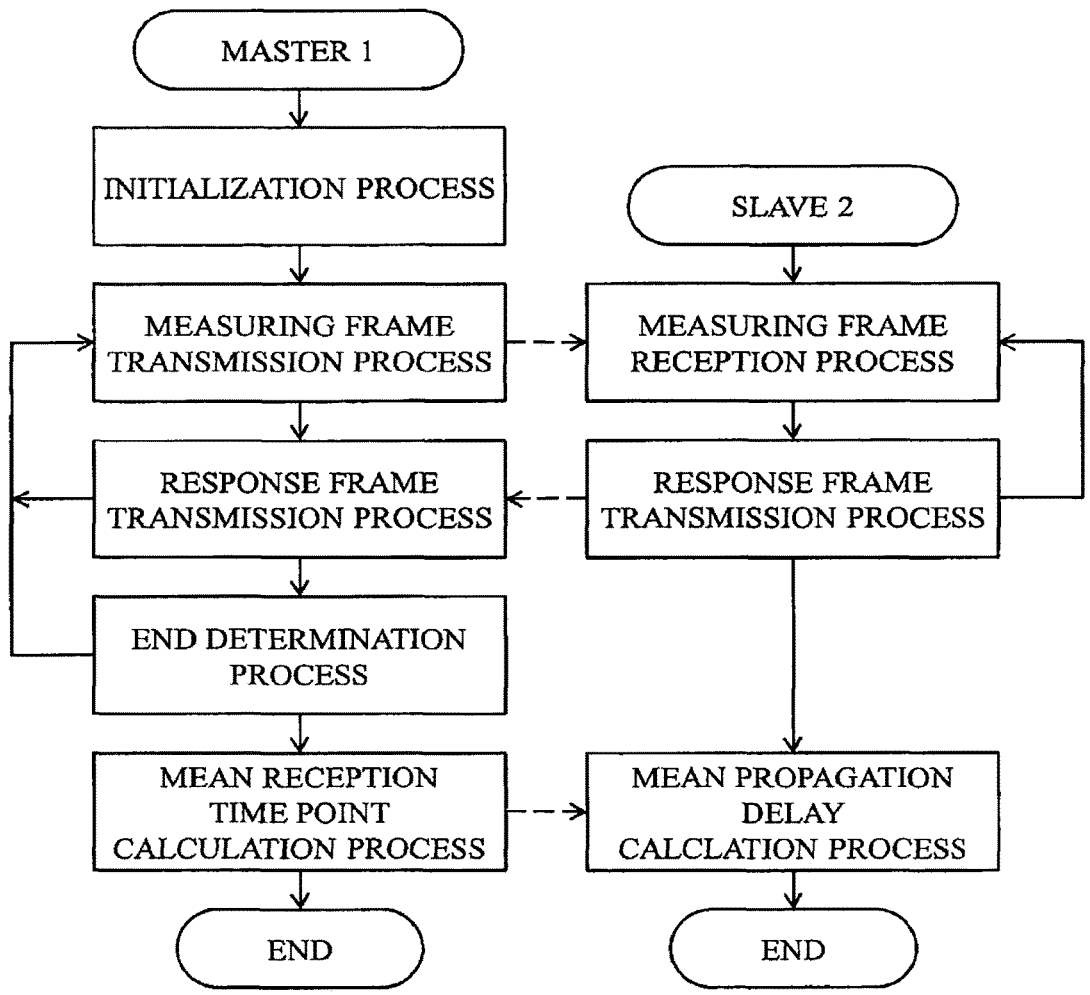
FIG. 18 shows an example of the flow of the operation of the master 1 and slave 2 in measuring communication according to Embodiment 2.

FIG. 18 shows an example of the flow of the operation of the master 1 and slave 2 in the measuring communication according to this embodiment.

The master clock 100 and the slave clock 200 normally count up.

Based on the counter value of the master clock 100, the master transmission device 110 sets the transmission time point which is to be contained in the frame to be transmitted.

Based on the counter value of the master clock 100, the master reception time point 1 storage device 121 sets the reception time point of the frame and stores it.

Based on the counter value of the slave clock 200, the slave transmission time point 1 storage device 211 sets the transmission time point of the frame and stores it.

Based on the counter value of the slave clock 200, the slave reception time point 1 storage device 221 sets the reception time point of the frame and stores it.

First, the master 1 carries out the initialization process.

The master transmission device 110 stores the list of the slaves 2 to be synchronized, and the frame number of the frame to be transmitted next.

The master transmission device 110 initializes the stored frame number. The initial value of the frame number is, for example, "1".

The master transmission device 110 stores the fact that a response frame has not been received yet, for each slave 2 included in the stored list.

Then, the master 1 carries out a measuring frame transmission process.

The master transmission device 110 transmits a measuring frame (main sync signal). The destination of the measuring frame is, among the slaves 2 included in the list it stores, all the slaves 2 that have not received a response frame yet. The measuring frame to be transmitted by the master transmission device 110 contains a frame number and transmission time point of the frame. The master transmission device 110 generates the measuring frame containing the frame number it stores and the transmission time point as the count value of the master clock 100, and transmits the measuring frame.

The slave 2 carries out a measuring frame reception process.

The slave reception device 220 receives the measuring frame.

The slave reception device 220 stores the frame number of the measuring frame that was received the last time. If the slave reception device 220 has not received any measuring frame yet, the slave reception device 220 stores a value representing no measuring frame being received, in place of a frame number. The value representing no measuring frame being received is, for example, "0".

The slave reception device 220 compares the frame number contained in the measuring frame it has received this time, with the stored frame number.

If the frame numbers are the same, the slave reception device 220 determines that the measuring frame received this time is a re-transmitted frame.

If the frame numbers are different, the slave reception device 220 determines that the measuring frame received this time is a new frame. The slave reception device 220 stores the frame number of the measuring frame received this time.

The slave reception device 220 notifies the slave reception time point 1 storage device 221 of the determination result as to whether or not the received measuring frame is a re-transmitted measuring frame.

The slave reception device 220 notifies the master transmission time point 1 storage device 231 of the determination result as to whether or not the received measuring frame is a re-transmitted measuring frame, and the transmission time point contained in the received measuring frame.

The slave reception device 220 notifies the slave transmission device 210 of the determination result as to whether or not the received measuring frame is a re-transmitted measuring frame, and the frame number contained in the received measuring frame.

If the slave reception time point 1 storage device 221 is notified by the slave reception device 220 of the determination result that the measuring frame is a new frame, the slave reception time point 1 storage device 221 notifies the slave reception time point 2 storage device 222 of the stored reception time point.

The slave reception time point 1 storage device 221, upon being notified of the determination result by the slave reception device 220, stores the count value of the slave clock 200 as the reception time point, regardless of the content of the notified determination result.

The slave reception time point i storage device (i is an integer of 2 or more to n−1 or less), upon being notified of the reception time point by the slave reception time point (i−1) storage device, notifies the slave reception time point (i+1) storage device of the stored reception time point. The slave reception time point i storage device stores the reception time point notified of by the slave reception time point (i−1) storage device.

The slave reception time point n storage device 223, upon being notified of the reception time point by the slave reception time point (n−1) storage device, stores the reception time point notified of by the slave reception time point (n−1) storage device.

If the master transmission time point 1 storage device 231 is notified by the slave reception device 220 of the determination result representing that the measuring frame is a new frame, the master transmission time point 1 storage device 231 notifies the master transmission time point 2 storage device 232 of the stored transmission time point.

The master transmission time point 1 storage device 231, upon being notified of the determination result by the slave reception device 220 and the transmission time point, stores the transmission time point notified of by the slave reception device 220, regardless of the content of the notified determination result.

The master transmission time point i storage device (i is an integer of 2 or more to n−1 or less), upon being notified of the transmission time point by the master transmission time point (i−1) storage device, notifies the master transmission time point (i+1) storage device of the stored transmission time point. The master transmission time point i storage device stores the transmission time point notified of by the master transmission time point (i−1) storage device.

The master transmission time point n storage device 233, upon being notified of the transmission time point by the master transmission time point (n−1) storage device, stores the transmission time point notified of by the master transmission time point (n−1) storage device.

Then, the slave 2 carries out a response frame transmission process.

The slave transmission device 210, upon being notified of the determination result and the frame number by the slave reception device 220, transmits a response frame (subordinate sync signal) to the master 1. The response frame to be transmitted by the slave transmission device 210 contains the frame number. The slave transmission device 210 generates the response frame that contains the frame number notified of by the slave reception device 220, and transmits the response frame.

The slave transmission device 210 notifies the slave transmission time point 1 storage device 211 of the determination result notified of by the slave reception device 220.

If the slave transmission time point 1 storage device 211 is notified by the slave transmission device 210 of the determination result representing that the measuring frame is a new frame, the slave transmission time point 1 storage device 211 notifies the slave transmission time point 2 storage device 212 of the stored transmission time point.

The slave transmission time point 1 storage device 211, upon being notified of the determination result by the slave transmission device 210, stores the count value of the slave clock 200 as the transmission time point, regardless of the content of the notified determination result.

The slave transmission time point i storage device (i is an integer of 2 or more to n−1 or less), upon being notified of the transmission time point by the slave transmission time point (i−1) storage device, notifies the slave transmission time point (i+1) storage device of the stored transmission time point. The slave transmission time point i storage device stores the transmission time point notified of by the slave transmission time point (i−1) storage device.

The slave transmission time point n storage device 213, upon being notified of the transmission time point by the slave transmission time point (n−1) storage device, stores the transmission time point notified of by the slave transmission time point (n−1) storage device.

The slave reception device 220 stands by until it receives the next frame from the master 1.

If the received frame is a measuring frame, the operation returns to the measuring frame reception process.

If the received frame is a notification frame, the operation advances to a mean propagation delay calculation process.

The master 1 carries out a response frame reception process.

The master reception device 120 receives a response frame.

The master reception device 120 acquires, from the response frame, an identifier that identifies the slave 2 which is the transmission source of the received response frame. The master reception device 120 notifies the master reception time point 1 storage device 121 of the acquired identifier. The master reception device 120 stores, for each slave 2 identified by the acquired identifier, the fact that the response frame has been received from the slave 2.

Each of the master reception time point i storage devices 121 to 123 (i is an integer of 1 or more to n or less) stores reception time points corresponding in number to the slaves 2 to be synchronized. Each reception time point is related to one slave 2.

The master reception time point 1 storage device 121, upon being notified of the identifier by the master reception device 120, notifies the master reception time point 2 storage device 122 of the notified identifier and the reception time point which is stored in relation to the slave 2 identified by that identifier. The master reception time point 1 storage device 121 stores the count value of the master clock 100, as the reception time point in relation to the notified identifier.

The master reception time point i storage device (i is an integer of 2 or more to n−1 or less), upon reception of the identifier and the reception time point from the master reception time point (i−1) storage device, notifies the master reception time point (i+1) storage device of the notified identifier and the reception time point which is stored in relation to the slave 2 identified by that identifier. The master reception time point i storage device stores the reception time point notified of by the master reception time point (i−1), in relation to the identifier notified of by the master reception time point (i−1) storage device.

The master reception time point n storage device 123, upon being notified of the identifier and the reception time point by the master reception time point (n−1) storage device, stores the reception time point notified of by the master reception time point (n−1) storage device, in relation to the identifier notified of by the master reception time point (n−1) storage device.

The master reception device 120 determines whether or not response frames are received from all the slaves 2 to be synchronized.

If the response frames are received from all the slaves 2, the operation advances to an end determination process.

If a response frame has not been received from at least any one slave 2, the operation stands by until a predetermined time-out period elapses from the time point at which the master transmission device 110 has transmitted the measuring frame.

If a response frame has not been received from at least any one slave 2 even after the lapse of the time-out period, the operation returns to the measuring frame transmission process. In the measuring frame transmission process, the master transmission device 110 re-transmits the measuring frame. The destination of the measuring frame to be re-transmitted is the slaves 2 that are the transmission source of the response frame which is not received yet. The slaves 2 that are the transmission source of the response frame which is received will be excluded from the destination. The frame number contained in the measuring frame to be re-transmitted is the same as that of the measuring frame of the last time. Unlike the transmission time point of the measuring frame of the last time, the transmission time point contained in the measuring frame to be re-transmitted is the transmission time point of the measuring frame to be re-transmitted.

Then, the master 1 carries out the end determination process.

The master transmission device 110 increments the stored frame number by 1, and stores the incremented frame number.

The master transmission device 110 stores, for each slave 2 included in the stored list, the fact that a response frame has not been received yet.

The master transmission device 110 compares the new frame number with n.

If the new frame number is larger than n, the operation advances to a mean reception time point calculation process.

If the new frame number is equal to or less than n, the operation returns to the measuring frame transmission process. In the measuring frame transmission process, the master transmission device 110 transmits the next measuring frame. The destination of the next measuring frame is all the slaves 2 that are to be synchronized. The frame number to be contained in the next measuring frame is larger than the frame number of the measuring frame of the last time by 1.

Finally, the master 1 carries out the mean reception time point calculation process.

The master mean reception time point calculation device 124 calculates master mean reception time points corresponding in number to the slaves 2 to be synchronized. Each master mean reception time point is related to one slave 2.

The master mean reception time point calculation device 124 averages the reception time points stored in the master reception time point i storage device (i is an integer of 1 or more to n or less) for one slave 2, thus calculating the master mean reception time point of that slave 2. The master mean reception time point calculation device 124 calculates the master mean reception time points for all the slaves 2 to be synchronized.

The master transmission device 110 transmits notification frames corresponding in number to the slave 2 to be synchronized. Each notification frame is transmitted to any one of the slaves 2 to be synchronized. The notification frame to be transmitted by the master transmission device 110 contains the master mean reception time point. The master mean reception time point contained in the notification frame to be transmitted to a certain frame 2 has been calculated for that slave 2 by the master mean reception time point calculation device 124.

The slave 2 carries out the mean propagation delay calculation process.

The slave reception device 220 receives the notification frame.

The slave reception device 220 notifies the mean propagation delay calculation device 240 of the master mean reception time point contained in the received notification frame.

The slave mean transmission time point calculation device 214 averages the transmission time points stored in the slave transmission time point i storage devices 211 to 213 (i is an integer of 1 or more to n or less), thus calculating the slave mean transmission time point.

The slave mean reception time point calculation device 224 averages the reception time points stored in the slave reception time point i storage devices 221 to 223 (i is an integer of 1 or more to n or less), thus calculating the slave mean reception time point.

The master mean transmission time point calculation device 234 averages the transmission time points stored in the master transmission time point i storage devices 231 to 233 (i is an integer of 1 or more to n or less), thus calculating the master mean transmission time point.

The slave mean reception time point storage device 225 stores the slave mean reception time point calculated by the slave mean reception time point calculation device 224.

The master mean transmission time point storage device 235 stores the master mean transmission time point calculated by the master mean transmission time point calculation device 234.

The mean propagation delay calculation device 240 calculates the mean propagation delay based on the master mean transmission time point stored in the master mean transmission time point storage device 235, the slave mean reception time point stored in the slave mean reception time point storage device 225, the slave mean transmission time point stored in the slave mean transmission time point calculation device 214, and the master mean transmission time point notified of by the slave reception device 220.

For example, the mean propagation delay calculation device 240 calculates the difference (Tmr−Tmt0) of subtracting master mean transmission time point Tmt0 from master mean reception time point Tmr. The mean propagation delay calculation device 240 calculates the difference (Tsr0−Tst) of subtracting slave mean transmission time point Tst from slave mean reception time point Tsr0. The mean propagation delay calculation device 240 calculates the difference [(Tmr−Tmt0)−(Tsr0−Tst)] of subtracting the calculated difference (Tsr0−Tst) from the difference (Tmr−Tmt0). The mean propagation delay calculation device 240 calculates, as a mean propagation delay Tda, the quotient obtained by dividing the difference [(Tmr−Tmt0)−(Tsr0−Tst)] by 2.

$$Tda=[(Tmr-Tmt0)-(Tsr0-Tst)]/2$$

A configuration may also be possible in which the master mean reception time point is notified to the slave 2 from the master 1 not by the notification frame, but by the correcting frame transmitted in the correcting communication.

A configuration may also be possible in which the measuring communication is performed not in a parallel manner between the master 1 and the plurality of slaves 2 to be synchronized, but between the master 1 and one slave 2 repeatedly a number of times corresponding to the number of slaves 2 to be synchronized.

Figure 19:
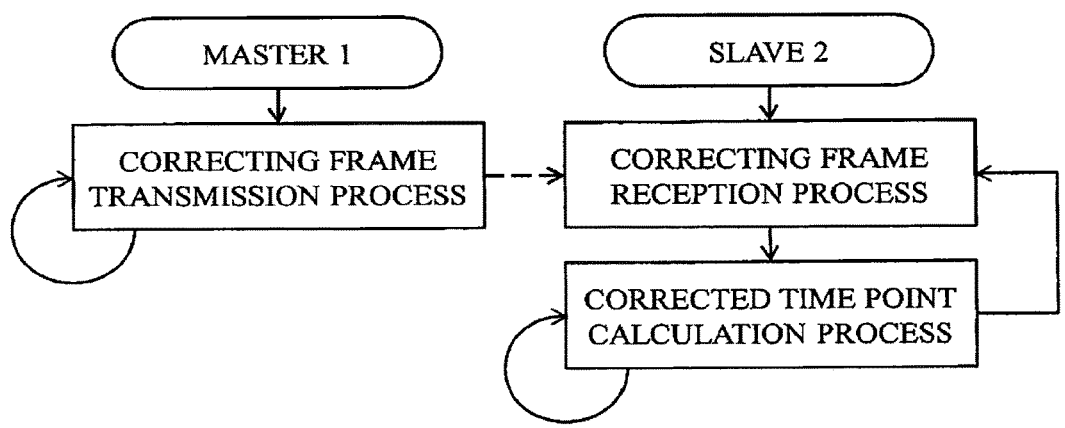
FIG. 19 shows an example of the flow of the operation of the master 1 and slave 2 in correcting communication according to Embodiment 2.

FIG. 19 shows an example of the flow of the operation of the master 1 and slave 2 in the correcting communication according to this embodiment.

The master 1 carries out a correcting frame transmission process.

The master transmission device 110 transmits the correcting frame (main sync signal). The destination of the correcting frame is all the slaves 2 to be synchronized which are included in the stored list. The correcting frame to be transmitted by the master transmission device 110 contains the transmission time point of the frame. The master transmission device 110 generates the correcting frame that contains the transmission time point which is the count value of the master clock 100, and transmits the correcting frame.

In a case where the master mean reception time point is notified to the slave 2 using the correcting frame, since the master mean reception time points of the respective slaves 2 differ, the correcting frame contains the list of a set of the identifier of the slave 2 and the master mean reception time point of that slave 2. The list to be contained in the correcting frame includes sets of an identifier and a master mean reception time point, in the same number as the number of the slaves 2 to be synchronized.

The master 1 repeats the correcting frame transmission process as needed.

The slave 2 carries out a correcting frame reception process.

The slave reception device 220 receives the correcting frame.

The slave reception device 220 notifies the slave reception time point 1 storage device 221 of the fact that the slave reception device 220 has received the correcting frame.

The slave reception device 220 notifies the master transmission time point 1 storage device 231 of the transmission time point contained in the received correcting frame.

The slave reception time point 1 storage device 221, upon being notified by the slave reception device 220 that the correcting frame is received, notifies the slave reception time point 2 storage device 222 of the stored reception time point. The slave reception time point 1 storage device 221 stores the count value of the slave clock 200, as the reception time point.

The slave reception time point i storage device (i is an integer of 2 or more to n−1 or less), upon being notified of the reception time point by the slave reception time point (i−1) storage device, notifies the slave reception time point (i+1) storage device of the stored reception time point. The slave reception time point i storage device stores the reception time point notified of by the slave reception time point (i−1) storage device.

The slave reception time point n storage device 223, upon being notified of the reception time point by the slave reception time point (n−1) storage device, stores the reception time point notified of by the slave reception time point (n−1) storage device.

The master transmission time point 1 storage device 231, upon being notified of the transmission time point by the slave reception device 220, notifies the master transmission time point 2 storage device 232 of the transmission time point it stores. The master transmission time point 1 storage device 231 stores the transmission time point notified of by the slave reception device 220.

The master transmission time point i storage device (i is an integer of 2 or more to n−1 or less), upon being notified of the transmission time point by the master transmission time point (i−1) storage device, notifies the master transmission time point (i+1) storage device of the transmission time point it stores. The master transmission time point i storage device stores the transmission time point notified of by the master transmission time point (i−1) storage device.

The master transmission time point n storage device 233, upon being notified of the transmission time point by the master transmission time point (n−1) storage device, stores the transmission time point notified of by the master transmission time point (n−1) storage device.

The slave mean reception time point calculation device 224 averages the reception time points stored by the slave reception time point i storage devices 221 to 223 (i is an integer of 1 or more to n or less), thus calculating the slave mean reception time point.

The master mean transmission time point calculation device 234 averages the transmission time points stored by the master transmission time point i storage devices 231 to 233 (i is an integer falling within a range of 1 or more and n or less), thus calculating the master mean transmission time point.

The quartz deviation ratio calculation device 241 calculates the quartz deviation ratio based on the slave mean reception time point calculated by the slave mean reception time point calculation device 224, the slave mean reception time point stored by the slave mean reception time point storage device 225, the master mean reception time point calculated by the master mean transmission time point calculation device 234, and the master mean transmission time point stored in the master mean transmission time point storage device 235.

For example, the quartz deviation ratio calculation device 241 calculates the difference (Tmt1−Tmt0) of subtracting master mean transmission time point Tmt0 stored by the master mean transmission time point storage device 235 from master mean transmission time point Tmt1 calculated by the master mean transmission time point calculation device 234. The quartz deviation ratio calculation device 241 calculates the difference (Tsr1−Tsr0) of subtracting slave mean reception time point Tsr0 stored by the slave mean reception time point storage device 225 from slave mean reception time point Tsr1 calculated by the slave mean reception time point calculation device 224. The quartz deviation ratio calculation device 241 calculates, as a quartz deviation ratio Tc, the quotient obtained by dividing the difference (Tmt1−Tmt0) by the difference (Tsr1−Tsr0).

$$Tc=(Tmt1-Tmt0)/(Tsr1-Tsr0)$$

The slave mean reception time point calculated by the slave mean reception time point calculation device 224 and the slave mean reception time point stored by the slave mean reception time point storage device 225 differ in the following manner: the latter is the mean value of the reception time points of n of measuring frames received by the slave 2 in the measuring communication; in contrast, the former is the mean value of n of reception time points consisting of the reception time points of the correcting frames received by the slave 2 in the correcting communication and the reception time points of the measuring frames received by the slave 2 in the measuring communication. Assume that the number of correcting frames received by the slave 2 in the correcting communication is k. Then, reception time points of (n−k) of measuring frames counted from the newer one, out of n of measuring frames received by the slave 2 in the measuring communication, are used.

Likewise, the master mean transmission time point calculated by the master mean transmission time point calculation device 234 and the master mean transmission time point stored by the master mean transmission time point storage device 235 differ in the following manner: the latter is the mean value of the transmission time points of n of measuring frames transmitted by the master 1 in the measuring communication; in contrast, the former is the mean value of n of transmission time points consisting of the transmission time points of k of correcting frames received by the master 1 in the correcting communication and the transmission time points of (n−k) of measuring frames transmitted by the master 1 in the measuring communication.

In the time point synchronization system 10 according to Embodiment 1, the plurality of main sync signals transmitted/received in the first measuring process 61 are grouped as the first group, and the plurality of main sync signals transmitted/received in the second measuring process 62 are grouped as the second group. Then, the speed ratio (quartz deviation ratio) is calculated based on the mean values of the transmission time points and reception time points of the main sync signals belonging to the respective groups.

In contrast to this, in the time point synchronization system 10 according to this embodiment, n of measuring frames transmitted/received in the measuring communication are grouped as the first group, and the k of correcting frames transmitted/received in the correcting communication and the (n−k) of measuring frames transmitted/received in the measuring communication are grouped together as the second group. Then, the quartz deviation ratio is calculated based on the mean values of the transmission time points and reception time points of the frames belonging to the respective groups.

In short, in Embodiment 1, the first group and the second group are independent from each other and do not overlap. In contrast, in this embodiment, the first group and the second group overlap.

Then, even if there is only one correcting frame yet that has been transmitted/received in the correcting communication, the quartz deviation ratio can be calculated. This can shorten the time interval that is taken until calculation of the corrected time point becomes possible.

A configuration may also be possible where the quartz deviation ratio calculation device 241 does not calculate the quartz deviation ratio until the number of correcting frames transmitted/received in the correcting communication reaches n or more and the first and second groups no longer overlap.

Then, the slave 2 carries out a corrected time point calculation process.

The slave corrected time point generating device 242 corrects a cont value Ts of the slave clock 200 based on the mean propagation delay Tda calculated by the mean propagation delay calculation device 240, the quartz deviation ratio Tc calculated by the quartz deviation ratio calculation device 241, the master mean transmission time point Tmt1 calculated by the master mean transmission time point calculation device 234, and the slave mean transmission time point Tsr1 calculated by the slave mean reception time point calculation device 224, thus calculating the corrected time point.

For example, the slave corrected time point generating device 242 calculates the difference (Ts−Tsr1) of subtracting the slave mean transmission time point Tsr1 from the count value Ts. The slave corrected time point generating device 242 calculates the product (Ts−Tsr1)×Tc obtained by multiplying the difference (Ts−Tsr1) by the quartz deviation ratio Tc. The slave corrected time point generating device 242 calculates, as a corrected time point Tms, the sum of the product (Ts−Tsr1)×Tc, the master mean transmission time point Tmt1, and the mean propagation delay Tda.

$$Tms=(Ts-Tsr1) \times Tc+Tmt1+Tda$$

The slave 2 repeats the corrected time point calculation process as needed.

When a correcting frame is received from the master 1, the operation returns to the correcting frame reception process.

By averaging the transmission time points and the reception time points respectively, an influence caused by the fluctuation of the propagation delay time interval can be suppressed.

Assume that the propagation delay in one communication is defined as Td, and the difference between the propagation delay Td and the mean propagation delay Tda is defined as Δ.

$$Tsrn=Tmtn+Td=Tmtn+Tda+\Delta$$

Note that Tsrn represents the actual reception time point at which the slave 2 has received the frame, and that Tmtn represents the actual transmission time point at which the master 1 has transmitted the frame.

When Tsrn of n times of communication are averaged, $$\Sigma Tsrn/N=\Sigma Tmtn/N+Tda+\Sigma \Delta/N$$

is established.

If n is sufficiently large, ΣΔ/N approximates to 0 because of the central limit theorem. As a result, the influence caused by the fluctuation of the propagation delay time interval can be suppressed.

$$\Sigma Tsrn/N=\Sigma Tmtn/N+Tda$$

This effect can be obtained in the quartz deviation correction as well.

As described above, by averaging the propagation delay time intervals of the plurality of times of communications and approximating the propagation delay time interval of each communication to an average propagation delay (to be referred to as mean propagation delay hereinafter), an error caused by the fluctuation of the propagation delay time interval can be suppressed.

The master 1 manages the number of times of the round-trip communication of the measuring frame, by means of the frame number. Hence, even if the master 1 or some slave 2 fails in receiving the measuring frame, the measuring frame can be reliably reciprocated N times between the master 1 and all the slaves 2.

The transmission time point of the master 1 is stored in the slave 2. Hence, even if some slave 2 fails in receiving the correcting frame, correction can be practiced in only the slave 2 that has succeeded in communication.

In the time point synchronization system 10 described above, the master 1 calculates the mean reception time point of the master 1.

The slave 2 calculates the latest mean transmission time point of the master 1, the latest mean reception time point of the slave 2, and the mean transmission time point of the slave 2, and stores the mean transmission time point of the master 1 and the mean reception time point of the slave 2.

The average propagation delay of the communication between the master 1 and the slaves 2, and the ratio (quartz deviation ratio) of the operation of the counter of the master 1 to the operation of the counter of the slave 2 are calculated from the mean transmission time points and mean reception time points of the master 1 and slave 2. The propagation delay and the difference between the operations of the counters are corrected.

By averaging the propagation delay time intervals of the plurality of times of communications and approximating the propagation delay time interval of each communication to an average propagation delay (mean propagation delay), an error caused by the fluctuation of the propagation delay time interval can be suppressed.

Embodiment 3

Embodiment 3 will be described with reference to FIG. 20.

In this embodiment, another example of the correction parameter calculation method will be described.

Portions that are identical to those in Embodiment 1 or Embodiment 2 will be denoted by the same reference numerals as in Embodiment 1 or Embodiment 2, and their explanation will be omitted.

The overall configuration of a time point synchronization system 10 according to this embodiment, and the configuration of the functional blocks of a main device 12, a subordinate device 13, and a correction parameter calculation device 14 are the same as those in Embodiment 1.

Figure 20:
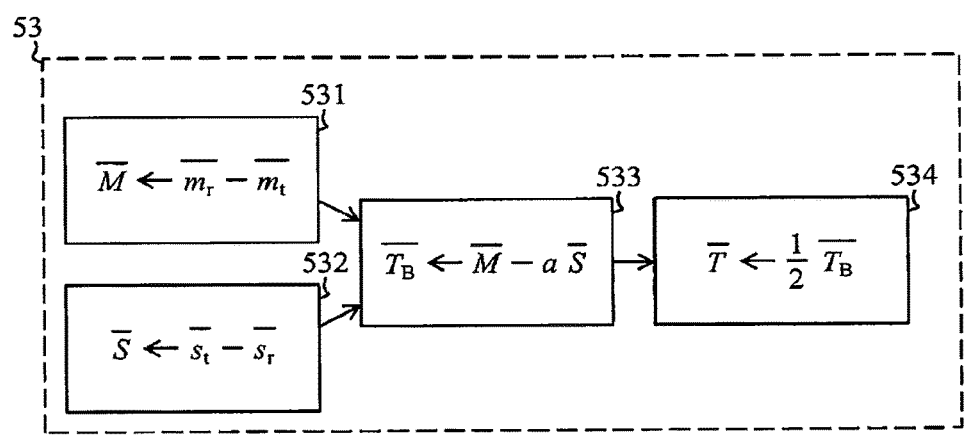
FIG. 20 shows an example of the configuration of the detailed blocks of a propagation mean time interval calculation part 53 according to Embodiment 3.

FIG. 20 shows an example of the configuration of the detailed blocks of a propagation mean time interval calculation part 53.

The propagation mean time interval calculation part 53 has, for example, a main transmission/reception mean time point difference calculation part 531, a subordinate reception/transmission mean time point difference calculation part 532, a round-trip propagation mean time interval calculation part 533, and a single-way propagation mean time interval calculation part 534.

The main transmission/reception mean time point difference calculation part 531, the subordinate reception/transmission mean time point difference calculation part 532, and the single-way propagation mean time interval calculation part 534 are the same as those in Embodiment 1.

The round-trip propagation mean time interval calculation part 533 calculates a round-trip propagation mean time interval. For example, the round-trip propagation mean time interval calculation part 533 calculates, as the round-trip propagation mean time interval, the difference obtained by subtracting a product, which is obtained by multiplying a subordinate reception/transmission mean time point difference calculated by the subordinate reception/transmission mean time point difference calculation part 532, by a speed ratio a calculated by a speed ratio calculation part 52, from a main transmission/reception mean time point difference calculated by the main transmission/reception mean time point difference calculation part 531.

The speed ratio can be obtained from a propagation mean time interval independently. Hence, using the speed ratio, the reception/transmission mean time point difference based on the time point of a subordinate clock device 31 is converted into a reception/transmission mean time point difference based on the time point of a main clock device 21. The propagation mean time interval is calculated using the reception/transmission mean time point difference, so that the propagation mean time interval can be calculated more accurately.

Embodiment 4

Embodiment 4 will be described with reference to FIG. 21 to FIG. 26.

In this embodiment, still another example of the correction parameter calculation method will be described.

Portions that are identical to those in Embodiment 1 to Embodiment 3 will be denoted by the same reference numerals as in Embodiment 1 to Embodiment 3, and their explanation will be omitted.

The overall configuration of a time point synchronization system 10 according to this embodiment, and the configuration of the functional blocks of a main device 12 and a subordinate device 13 are the same as those in Embodiment 1.

Figure 21:
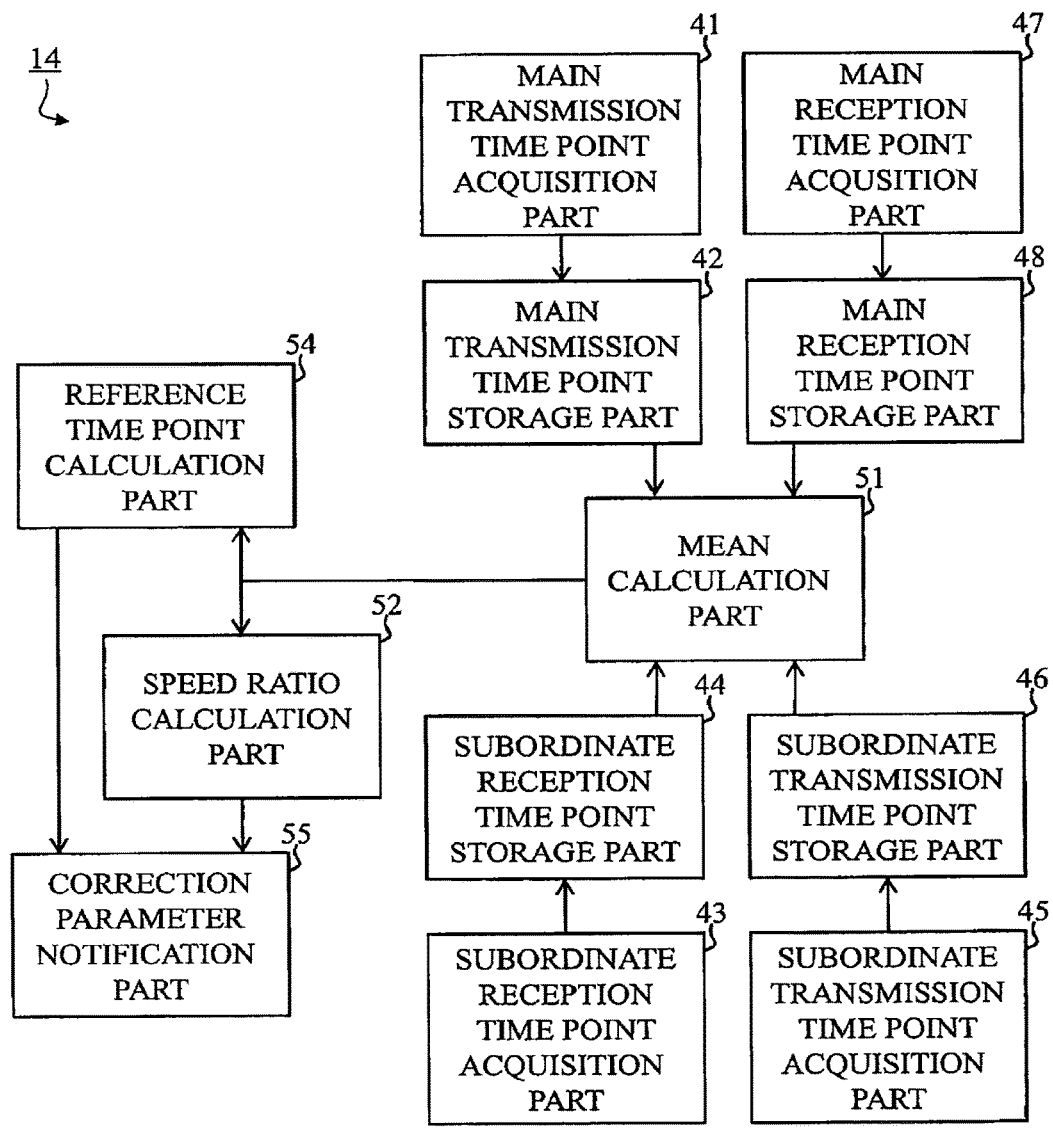
FIG. 21 shows an example of the configuration of the functional blocks of a correction parameter calculation device 14 according to Embodiment 4.

FIG. 21 shows an example of the configuration of the functional blocks of a correction parameter calculation device 14 according to this embodiment.

The correction parameter calculation device 14 has, for example, a main transmission time point acquisition part 41, a main transmission time point storage part 42, a subordinate reception time point acquisition part 43, a subordinate reception time point storage part 44, a subordinate transmission time point acquisition part 45, a subordinate transmission time point storage part 46, a main reception time point acquisition part 47, a main reception time point storage part 48, a mean calculation part 51, a speed ratio calculation part 52, a reference time point calculation part 54, and a correction parameter notification part 55.

Of these functional blocks, the main transmission time point acquisition part 41, the main transmission time point storage part 42, the subordinate reception time point acquisition part 43, the subordinate reception time point storage part 44, the subordinate transmission time point acquisition part 45, the subordinate transmission time point storage part 46, and the correction parameter notification part 55 are the same as those of Embodiment 1.

The mean calculation part 51 calculates a main transmission mean time point, a subordinate reception mean time point, a subordinate transmission mean time point, and a main reception mean time point. Also, the mean calculation part 51 calculates the mean value of the products of the main transmission time points and subordinate reception time points. The mean value of the products of the main transmission time points and subordinate reception time points will be called "mean main transmission/reception time point product". The mean calculation part 51 calculates the mean value of the products of the subordinate transmission time points and main reception time points. The mean value of the products of the subordinate transmission time points and main reception time points will be called "mean subordinate transmission/reception time point product". The mean calculation part 51 calculates the mean value of the squares of the subordinate reception time points. The mean value of the squares of the subordinate reception time points will be called "mean square subordinate reception time point". The mean calculation part 51 calculates the mean value of the squares of the subordinate transmission time points. The mean value of the squares of the subordinate transmission time points will be called "mean square subordinate transmission time point".

The speed ratio calculation part 52 calculates a speed ratio based on the main transmission mean time point, subordinate reception mean time point, subordinate transmission mean time point, main reception mean time point, mean main transmission/reception time point product, mean subordinate transmission/reception time point product, mean square subordinate reception time point, and mean square subordinate transmission time point which are calculated by the mean calculation part 51.

The reference time point calculation part 54 calculates a reference time point based on the main transmission mean time point, subordinate reception mean time point, subordinate transmission mean time point, and main reception mean time point which are calculated by the mean calculation part 51.

Figure 22:
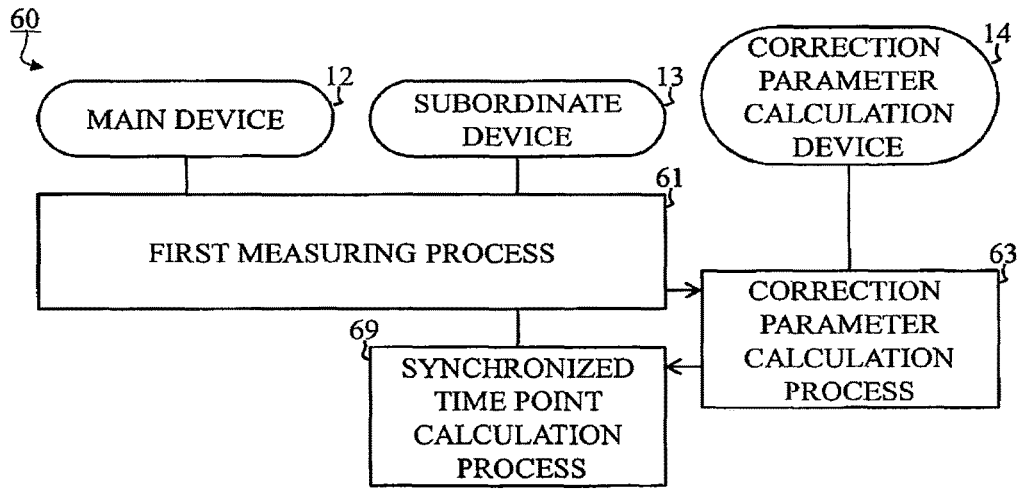
FIG. 22 shows an example of the flow of a time point synchronization process 60 according to Embodiment 4.

FIG. 22 shows an example of the flow of a time point synchronization process 60 according to this embodiment.

The time point synchronization process 60 has a first measuring process 61, a correction parameter calculation process 63, and a synchronized time point calculation process 69.

The flow of the first measuring process 61 and synchronized time point calculation process 69 is the same as that in Embodiment 1.

A configuration may also be possible where, in the time point synchronization process 60 of the second time and onwards, the time point measured in the first measuring process 61 of the time point synchronization process 60 executed previously is utilized. Then, the measurement in the first measuring process 61 can be omitted partly or entirely.

Figure 23:
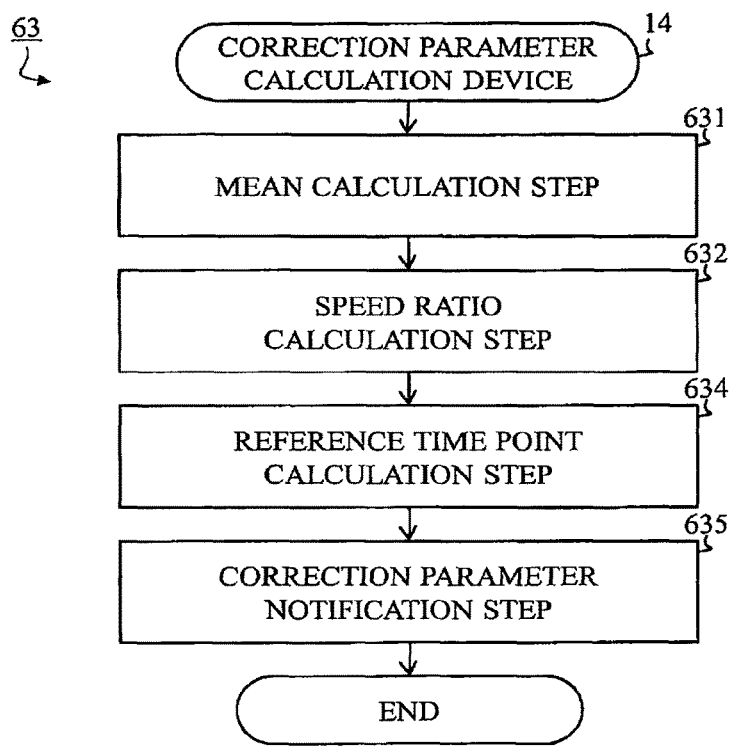
FIG. 23 shows an example of the flow of a correction parameter calculation process 63 according to Embodiment 4.

FIG. 23 shows an example of the flow of the correction parameter calculation process 63 according to this embodiment.

The correction parameter calculation process 63 has, for example, a mean calculation step 631, a speed ratio calculation step 632, a reference time point calculation step 634, and a correction parameter notification step 635.

In the mean calculation step 631, the correction parameter calculation device 14 (mean calculation part 51) calculates the main transmission mean time point, subordinate reception mean time point, subordinate transmission mean time point, main reception mean time point, mean main transmission/reception time point product, mean subordinate transmission/reception time point product, mean square subordinate reception time point, and mean square subordinate transmission time point.

The main transmission mean time point calculated by the correction parameter calculation device 14 is the mean value of a plurality of main transmission time points measured by the main device 12 in the first measuring process 61.

The subordinate reception mean time point calculated by the correction parameter calculation device 14 is the mean value of a plurality of subordinate reception time points measured by the subordinate device 13 in the first measuring process 61.

The subordinate transmission mean time point calculated by the correction parameter calculation device 14 is the mean value of a plurality of subordinate transmission time points measured by the subordinate device 13 in the first measuring process 61.

The main reception mean time point calculated by the correction parameter calculation device 14 is a mean value of a plurality of main reception time points measured by the main device 12 in the first measuring process 61.

The mean main transmission/reception time point product calculated by the correction parameter calculation device 14 is the mean value of the products of the main transmission time points and subordinate reception time points of the respective plurality of main sync signals which are transmitted by the main device 12 in the first measuring process 61.

The mean subordinate transmission/reception time point product calculated by the correction parameter calculation device 14 is the mean value of the products of the subordinate transmission time points and main time points of the respective plurality of subordinate sync signals which are transmitted by the subordinate device 13 in the first measuring process 61.

The mean square subordinate reception time point calculated by the correction parameter calculation device 14 is the mean value of the respective squares of the plurality of subordinate reception time points which are measured by the subordinate device 13 in the first measuring process 61.

The mean square subordinate transmission time point calculated by the correction parameter calculation device 14 is the mean value of the respective squares of the plurality of subordinate transmission time points which are measured by the subordinate device 13 in the first measuring process 61.

In the speed ratio calculation step 632, the correction parameter calculation device 14 (speed ratio calculation part 52) calculates the speed ratio. For example, the correction parameter calculation device 14 calculates the product of the main transmission mean time point calculated in the mean calculation step 631 and the subordinate reception mean time point calculated in the mean calculation step 631. The calculated product will be called "main transmission/reception mean time point product". The correction parameter calculation device 14 calculates the product of the subordinate transmission mean time point calculated in the mean calculation step 631 and the main reception mean time point calculated in the mean calculation step 631. The calculated product will be called "subordinate transmission/reception time point product". The correction parameter calculation device 14 calculates the difference of subtracting the sum of the main transmission/reception mean time point product and subordinate transmission/reception mean time point product, from the sum of the mean main transmission/reception time point product calculated in the mean calculation step 631 and the mean subordinate transmission/reception time point product calculated in the mean calculation step 631. The calculated difference will be called "transmission/reception time point product difference". The correction parameter calculation device 14 squares the subordinate reception mean time point calculated in the mean calculation step 631. The calculated square will be called "square subordinate reception mean time point". The correction parameter calculation device 14 squares the subordinate transmission mean time point calculated in the mean calculation step 631. The calculated square will be called "square subordinate transmission mean time point". The correction parameter calculation device 14 calculates the difference of subtracting the sum of the square subordinate reception mean time point and square subordinate transmission mean time point, from the sum of the mean square subordinate reception time point calculated in the mean calculation step 631 and the mean square subordinate transmission time point calculated in the mean calculation step 631. The calculated difference will be called "subordinate time point square difference". The correction parameter calculation device 14 calculates, as the speed ratio, the quotient obtained by dividing the transmission/reception time point product difference by the subordinate time point square difference.

In the reference time point calculation step 634, the correction parameter calculation device 14 (reference time point calculation part 54) calculates a main reference time point and a subordinate reference time point. For example, the correction parameter calculation device 14 calculates, as the subordinate reference time point, the quotient obtained by dividing by 2 the sum of the subordinate reception mean time point calculated in the mean calculation step 631 and the subordinate transmission mean time point calculated in the mean calculation step 631. The correction parameter calculation device 14 calculates, as the main reference time point, the quotient obtained by dividing by 2 the sum of the main transmission mean time point calculated in the mean calculation step 631 and the main reception mean time point calculated in the mean calculation step 631.

Figure 24:
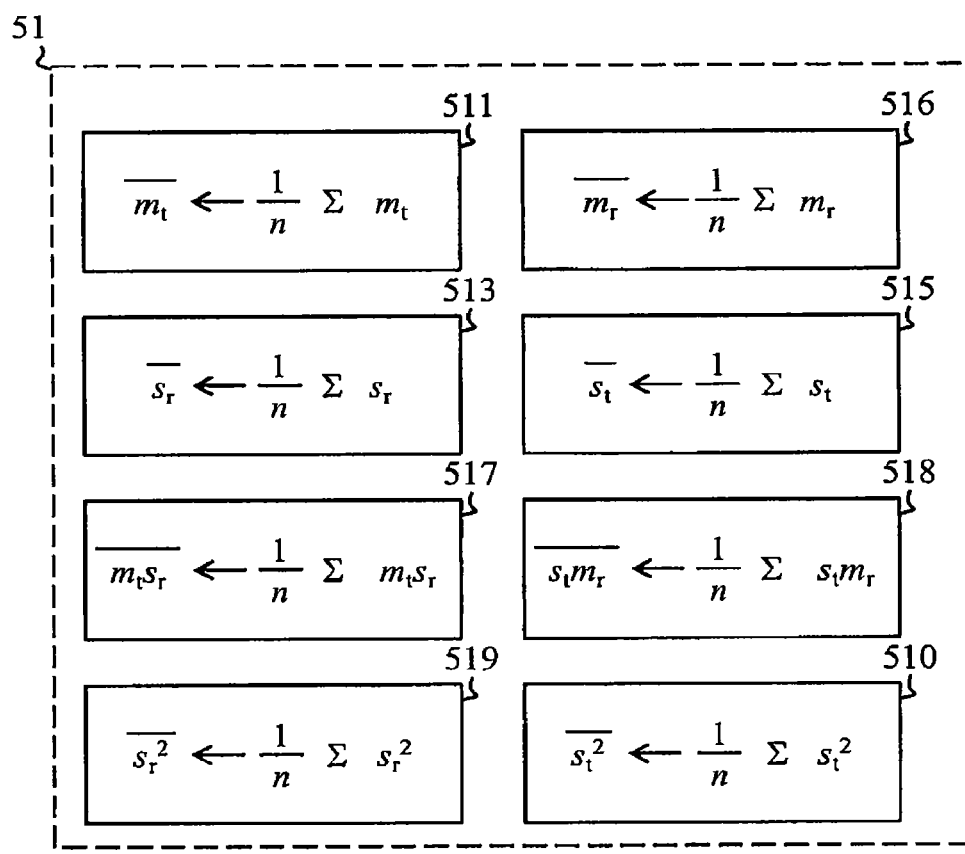
FIG. 24 shows an example of the configuration of the detailed blocks of a mean calculation part 51 according to Embodiment 4.

FIG. 24 shows an example of the configuration of the detailed blocks of the mean calculation part 51 according to this embodiment.

The mean calculation part 51 has, for example, a main transmission mean time point calculation part 511, a subordinate reception mean time point calculation part 513, a subordinate transmission mean time point calculation part 515, a main reception mean time point calculation part 516, a mean main transmission/reception time point product calculation part 517, a mean subordinate transmission/reception time point product calculation part 518, a mean square subordinate reception time point calculation part 519, and a mean square subordinate transmission time point calculation part 510.

The main transmission mean time point calculation part 511 calculates the main transmission mean time point. For example, where the number of main transmission time points $m_t$ measured by the main device 12 in the first measuring process 61 is n, the main transmission mean time point calculation part 511 calculates the sum of n of main transmission time points $m_t$. The main transmission mean time point calculation part 511 calculates, as the main transmission mean time point, the quotient obtained by dividing the calculated sum by n.

The subordinate reception mean time point calculation part 513 calculates the subordinate reception mean time point. For example, where the number of subordinate reception time points $s_r$ measured by the subordinate device 13 in the first measuring process 61 is n, the subordinate reception mean time point calculation part 513 calculates the sum of n of subordinate reception time points $s_r$. The subordinate reception mean time point calculation part 513 calculates, as the first subordinate reception mean time point, the quotient obtained by dividing the calculated sum by n.

The subordinate transmission mean time point calculation part 515 calculates the subordinate transmission mean time point. For example, where the number of subordinate transmission time points $s_t$ measured by the subordinate device 13 in the first measuring process 61 is n, the subordinate transmission mean time point calculation part 515 calculates the sum of n of subordinate transmission time points $s_t$. The subordinate transmission mean time point calculation part 515 calculates, as the subordinate transmission mean time point, the quotient obtained by dividing the calculated sum by n.

The main reception mean time point calculation part 516 calculates the main reception mean time point. For example, where the number of main reception time points $m_r$ measured by the main device 12 in the first measuring process 61 is n, the main reception mean time point calculation part 516 calculates the sum of n of main reception time points $m_r$. The main reception mean time point calculation part 516 calculates, as the main reception mean time point, the quotient obtained by dividing the calculated sum by n.

The mean main transmission/reception time point product calculation part 517 calculates the mean main transmission/reception time point product. For example, where the number of main sync signals transmitted by the main device 12 in the first measuring process 61 is n, the mean main transmission/reception time point product calculation part 517 calculates, for each main signal, the product of the main transmission time point $m_t$ measured by the main device 12 and the subordinate reception time point $s_r$ measured by the subordinate device 13. The mean main transmission/reception time point product calculation part 517 calculates the sum of n of calculated products. The mean main transmission/reception time point product calculation part 517 calculates, as the mean main transmission/reception time point product, the quotient obtained by dividing the calculated sum by n.

The mean subordinate transmission/reception time point product calculation part 518 calculates the mean subordinate transmission/reception time point product. For example, where the number of subordinate sync signals transmitted by the subordinate device 13 in the first measuring process 61 is n, the mean subordinate transmission/reception time point product calculation part 518 calculates, for each subordinate sync signal, the product of the subordinate transmission time point $s_t$ measured by the subordinate device 13 and the main reception time point $m_r$ measured by the main device 12. The mean subordinate transmission/reception time point product calculation part 518 calculates the sum of n of calculated products. The mean subordinate transmission/reception time point product calculation part 518 calculates, as the mean subordinate transmission/reception time point product, the quotient obtained by dividing the calculated sum by n.

The mean square subordinate reception time point calculation part 519 calculates the mean square subordinate reception time point. For example, where the number of subordinate reception time points $s_r$ measured by the subordinate device 13 in the first measuring process 61 is n, the mean square subordinate reception time point calculation part 519 calculates the square of each of n of subordinate reception time points $s_r$. The mean square subordinate reception time point calculation part 519 calculates the sum of n of calculated squares. The mean square subordinate reception time point calculation part 519 calculates, as the mean square subordinate reception time point, the quotient obtained by dividing the calculated sum by n.

The mean square subordinate transmission time point calculation part 510 calculates the mean square subordinate transmission time point. For example, where the number of subordinate transmission time points $s_t$ measured by the subordinate device 13 in the first measuring process 61 is n, the mean square subordinate transmission time point calculation part 510 calculates the square of each of n of subordinate transmission time points $s_t$. The mean square subordinate transmission time point calculation part 510 calculates the sum of n of calculated squares. The mean square subordinate transmission time point calculation part 510 calculates, as the mean square subordinate transmission time point, the quotient obtained by dividing the calculated sum by n.

Figure 25:
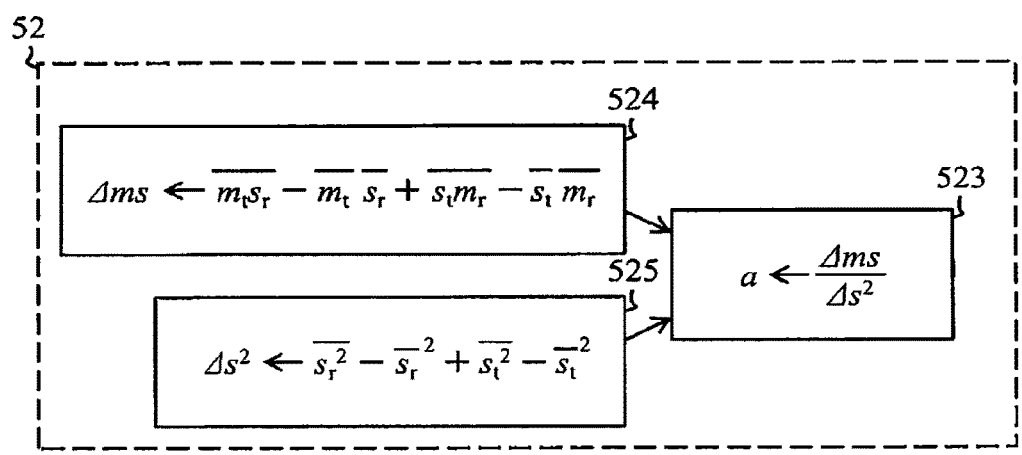
FIG. 25 shows an example of the configuration of the detailed blocks of a speed ratio calculation part 52 according to Embodiment 4.

FIG. 25 shows an example of the configuration of the detailed blocks of the speed ratio calculation part 52 according to this embodiment.

The speed ratio calculation part 52 has, for example, a transmission/reception time point product difference calculation part 524, a subordinate time point square difference calculation part 525, and a quotient calculation part 523.

The transmission/reception time point product difference calculation part 524 calculates a transmission/reception time point product difference $\Delta ms$.

For example, the transmission/reception time point product difference calculation part 524 calculates a main transmission/reception mean time point product by multiplying the main transmission mean time point calculated by the main transmission mean time point calculation part 511, by the subordinate reception mean time point calculated by the subordinate reception mean time point calculation part 513. The transmission/reception time point product difference calculation part 524 calculates the difference of subtracting the main transmission/reception mean time point product from the mean main transmission/reception time point product calculated by the mean main transmission/reception time point product calculation part 517. The transmission/reception time point product difference calculation part 524 calculates a subordinate transmission/reception mean time point product by multiplying the subordinate transmission mean time point calculated by the subordinate transmission mean time point calculation part 515, by the main reception mean time point calculated by the main reception mean time point calculation part 516. The transmission/reception time point product difference calculation part 524 calculates the difference of subtracting the subordinate transmission/reception mean time point product from the mean subordinate transmission/reception time point product calculated by the mean subordinate transmission/reception time point product calculation part 518. The transmission/reception time point product difference calculation part 524 calculates, as the transmission/reception time point product difference $\Delta ms$, the sum of the two calculated differences.

The subordinate time point square difference calculation part 525 calculates a subordinate time point square difference $\Delta s^2$.

For example, the subordinate time point square difference calculation part 525 calculates a square subordinate reception mean time point by squaring the subordinate reception mean time point calculated by the subordinate reception mean time point calculation part 513. The subordinate time point square difference calculation part 525 calculates the difference obtained by subtracting the square subordinate reception mean time point from the mean square subordinate reception time point calculated by the mean square subordinate reception time point calculation part 519. The subordinate time point square difference calculation part 525 calculates a square subordinate transmission mean time point by squaring the subordinate transmission mean time point calculated by the subordinate transmission mean time point calculation part 515. The subordinate time point square difference calculation part 525 calculates the difference of subtracting the square subordinate transmission mean time point from the mean square subordinate transmission time point calculated by the mean square subordinate transmission time point calculation part 510. The subordinate time point square difference calculation part 525 adds up the two calculated differences, and takes the sum as the subordinate time point square difference $\Delta s^2$.

The quotient calculation part 523 calculates, as the speed ratio a, the quotient obtained by dividing the transmission/reception time point product difference $\Delta ms$ calculated by the transmission/reception time point product difference calculation part 524, by the subordinate time point square difference $\Delta s^2$ calculated by the subordinate time point square difference calculation part 525.

Figure 26:
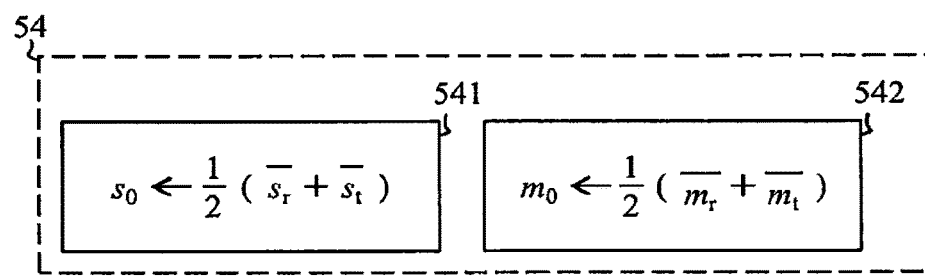
FIG. 26 shows an example of the configuration of the detailed blocks of a reference time point calculation part 54 according to Embodiment 4.

FIG. 26 shows an example of the configuration of the detailed blocks of the reference time point calculation part 54 according to this embodiment.

The reference time point calculation part 54 has, for example, a subordinate reference time point calculation part 541 and a main reference time point calculation part 542.

The subordinate reference time point calculation part 541 calculates a subordinate reference time point $s_0$.

For example, the subordinate reference time point calculation part 541 calculates the sum of the subordinate reception mean time point calculated by the subordinate reception mean time point calculation part 513 and the subordinate transmission mean time point calculated by the subordinate transmission mean time point calculation part 515. The subordinate reference time point calculation part 541 calculates, as the subordinate reference time point $s_0$, the quotient obtained by dividing the calculated sum by 2.

The main reference time point calculation part 542 calculates a main reference time point $m_0$.

For example, the main reference time point calculation part 542 calculates the sum of the main transmission mean time point calculated by the main transmission mean time point calculation part 511 and the main reception mean time point calculated by the main reception mean time point calculation part 516. The main reference time point calculation part 542 calculates, as the main reference time point $m_0$, the quotient obtained by dividing the calculated sum by 2.

Conversion of the subordinate reception time point $s_r$ measured by the subordinate device 13 into the time point of the main clock device 21 yields $a(s_r - s_0) + m_0$. Also, conversion of the subordinate transmission time point $s_t$ measured by the subordinate device 13 into the time point of the main clock device 21 yields $a(s_t - s_0) + m_0$. Accordingly, $$T_m = a \cdot r + b - m_t$$

$$T_s = m_r - a \cdot s_r - b$$

Note that $T_m$ is the main propagation time interval based on the time point of the main clock device 21; $T_s$ is the subordinate propagation time interval based on the time point of the main clock device 21; and $b$ is $m_0 - a \cdot s\{0\}$.

Assuming that the difference of subtracting the propagation mean time interval from the main propagation time interval $T_m$ is determined as $\Delta T_m$, and that the difference of subtracting the propagation mean time interval from the subordinate propagation time interval $T_s$ is determined as $\Delta T_s$, $a$ and $b$ with which a sum $f$ of the sum total of the squares of $\Delta T_m$ and the sum total of the squares of $\Delta T_s$ becomes smallest are obtained.

$$f = \Sigma \Delta T_m^2 + \Sigma \Delta T_s^2 \qquad \text{[Formula 11]}$$
$$= \Sigma(as_r + b - m_t - \overline{T})^2 + \Sigma(as_t + b - m_r + \overline{T})^2$$

where $$\overline{T} = \tfrac{1}{2}[\overline{m_r} - \overline{m_t} - a(\overline{s_t} - \overline{s_r})] \qquad \text{[Formula 12]}$$

Assume that [Formula 13]

$$\frac{\partial f}{\partial a} = \frac{\partial f}{\partial b} = 0$$

Then, [Formula 14]

$$\frac{\partial f}{\partial a} = 2\Sigma s_r(as_r + b - m_t - \overline{T}) + 2\Sigma s_t(as_t + b - m_r + \overline{T})$$
$$= 2a(\Sigma s_r^2 + \Sigma s_t^2) + 2b(\Sigma s_r + \Sigma s_t) +$$
$$2(\Sigma s_t - \Sigma s_r)\overline{T} - 2(\Sigma m_t s_r + \Sigma s_t m_r)$$
$$= 2n\left[a(\overline{s_r^2} + \overline{s_t^2}) + b(\overline{s_r} + \overline{s_t}) + (\overline{s_t} - \overline{s_r})\overline{T} - (\overline{m_t s_r} + \overline{s_t m_r})\right]$$

$$\frac{\partial f}{\partial b} = 2\Sigma(as_r + b - m_t - \overline{T}) + 2\Sigma(as_t + b - m_r + \overline{T})$$
$$= 2a(\Sigma s_r + \Sigma s_t) + 4nb - 2(\Sigma m_t + \Sigma m_r)$$
$$= 2n[a(\overline{s_r} + \overline{s_t}) + 2b - (\overline{m_t} + \overline{m_r})]$$

Hence, $$a = \frac{\overline{m_t s_r} - \overline{m_t}\,\overline{s_r} + \overline{s_t m_r} - \overline{s_t}\,\overline{m_r}}{\overline{s_r^2} - \overline{s_r}^2 + \overline{s_t^2} - \overline{s_t}^2}, \qquad \text{[Formula 15]}$$

$$b = \frac{1}{2}[\overline{m_t} + \overline{m_r} - a(\overline{s_r} + \overline{s_t})]$$

Therefore, $$s_0 = \tfrac{1}{2}(\overline{s_r} + \overline{s_t}),\ m_0 = \tfrac{1}{2}(\overline{m_t} + \overline{m_r}) \qquad \text{[Formula 16]}$$

In this manner, the speed ratio $a$, the subordinate reference time point $s_0$, and the main reference time point $m_0$ are calculated by taking the fluctuation of the propagation time interval as a kind of measurement error and using the least squares method.

A second measuring process 62 is accordingly unnecessary to perform. This can shorten the time interval that is taken until calculation of the corrected time point becomes possible.

The configuration described in each of the embodiments described above is merely an example and can be replaced by another configuration. For example, configurations described in different embodiments may be combined within a non-contradictory extent. The configuration of a non-substantial portion may be replaced by another configuration.

The correction parameter calculation device (14; master 1, slave 2) described above has a main transmission time point storage part (42; master transmission time point i storage devices 231 to 233), a subordinate reception time point storage part (44; slave reception time point i storage devices 221 to 223), and a speed ratio calculation part (52; quartz deviation ratio calculation device 241).

The main transmission time point storage part stores respective main transmission time points at which a main device (12; master 1) has transmitted a plurality of main sync signals (measuring frame, correcting frame) and which are measured using a main clock device (21; master clock 100).

The subordinate reception time point storage part stores respective subordinate reception time points at which a subordinate device (13; slave 2) has received the plurality of main sync signals and which are measured using a subordinate clock device (31; slave clock 200).

The speed ratio calculation part calculates a speed ratio (quartz deviation ratio) of a ticking time speed of the main clock device to a ticking time speed of the subordinate clock device, based on a main transmission mean time point (master mean transmission time point) being a mean of the main transmission time points and a subordinate reception mean time point (slave mean reception time point) being a mean of the subordinate reception time points.

With the correction parameter calculation device, the speed ratio can be calculated accurately even if the propagation time intervals of the sync signals are not constant.

The speed ratio calculation part (52; 241) has a main transmission time point difference calculation part (521; 241), a subordinate reception time point difference calculation part (522; 241), and quotient calculation part (523; 241).

The main transmission time point difference calculation part calculates a main transmission time point difference of subtracting, from a first main transmission mean time point being a mean of a plurality of main transmission time points stored by the main transmission time point storage part (42; 231 to 233) for a plurality of main sync signals (main sync signals in the first measuring process 61; measuring frames) belonging to a first group out of the plurality of main sync signals, a second main transmission mean time point being a mean of a plurality of main transmission time points stored by the main transmission time point storage part for a plurality of main sync signals (main sync signals by the second measuring process 62; correcting frames) belonging to a second group which is different from the first group out of the plurality of main sync signals.

The subordinate reception time point difference calculation part calculates a subordinate reception time point difference of subtracting, from a first subordinate reception mean time point being a mean of a plurality of subordinate reception time points stored by the subordinate reception time point storage part for the plurality of main sync signals belonging to the first group, a second subordinate reception mean time point being a mean of a plurality of subordinate reception time points stored by the subordinate reception time point storage part for the plurality of main sync signals belonging to the second group.

The quotient calculation part calculates the speed ratio, by calculating a quotient which is obtained by dividing the main transmission time point difference by the subordinate reception time point difference.

According to the correction parameter calculation device, the speed ratio can be calculated accurately even if the propagation time intervals of the sync signals are not constant.

The correction parameter calculation device (14) further has a subordinate transmission time point storage part (46) and a main reception time point storage part (48).

The subordinate transmission time point storage part stores respective subordinate transmission time points at which the subordinate device (13) has transmitted a plurality of subordinate sync signals and which are measured using the subordinate clock device (31).

The main reception time point storage part stores respective main reception time points at which the main device (12) has received the plurality of subordinate sync signals and which are measured using the main clock device (21).

The speed ratio calculation part (52) has a product difference calculation part (transmission/reception time point product difference calculation part 524), a square difference calculation part (subordinate time point square difference calculation part 525), and a quotient calculation part (523).

The product difference calculation part calculates a product difference (transmission/reception time point product difference) of subtracting a sum of a product (main transmission/reception mean time point product) obtained by multiplying the main transmission mean time point by the subordinate reception mean time point, and a product (subordinate transmission/reception mean time point product) obtained by multiplying a subordinate transmission mean time point being a mean of the subordinate transmission time points, by a main reception mean time point being a mean of the main reception time points, from a sum of a mean value (mean main transmission/reception time point product) of products obtained by multiplying the main transmission time points by the subordinate reception time points, and a mean value (mean subordinate transmission/reception time point product) of products obtained by multiplying the subordinate transmission time points by the main reception time points.

The square difference calculation part calculates a square difference (subordinate time point square difference) of subtracting a sum of a square (square subordinate reception mean time point) of the subordinate reception mean time point and a square (square subordinate transmission mean time point) of the subordinate transmission mean time point, from a sum of a mean value (mean square subordinate reception time point) of squares of the subordinate reception time points and a mean value (mean square subordinate transmission time point) of squares of the subordinate transmission time points.

The quotient calculation part calculates the speed ratio, by calculating a quotient which is obtained by dividing the product difference by the square difference.

With the correction parameter calculation device, the speed ratio can be calculated accurately even if the propagation time intervals of the sync signals are not constant.

The correction parameter calculation device (14; 1, 2) further has a subordinate transmission time point storage part (46; slave reception time point i storage devices 221 to 223), a main reception time point storage part (48; master reception time point i storage devices 121 to 123), and a propagation mean time interval calculation part (53; mean propagation delay calculation device 240).

The subordinate transmission time point storage part stores respective subordinate transmission time points at which the subordinate device (13; 2) has transmitted a subordinate sync signal (response frame) a plurality of times and which are measured using the subordinate clock device (31; 200).

The main reception time point storage part stores respective main reception time points at which the main device (12; 1) has received the subordinate sync signal a plurality of times and which are measured using the main clock device (21; 100).

The propagation mean time interval calculation part calculates a propagation mean time interval being a mean of a main propagation time interval from a time point at which the main device has transmitted the main sync signal to a time point at which the subordinate device has received the main sync signal, and a subordinate propagation time interval from a time point at which the subordinate device has transmitted the subordinate sync signal to a time point at which the main device has received the subordinate sync signal, based on the main transmission mean time point, the subordinate reception mean time point, a subordinate transmission mean time point (slave mean transmission time point) being a mean of the subordinate transmission time points, and a main reception mean time point (master mean reception time point) being a mean of the main reception time points.

With the correction parameter calculation device, the correction parameter can be calculated accurately even if the propagation time intervals of the sync signals are not constant.

The propagation mean time interval calculation part (53; 240) calculates the propagation mean time interval, by calculating a quotient which is obtained by dividing by 2 a difference of subtracting a sum of the main transmission mean time point and the subordinate reception mean time point, from a sum of the main reception mean time point and the subordinate reception mean time point.

With the correction parameter calculation device, the correction parameter can be calculated accurately even if the propagation time intervals of the sync signals are not constant.

The propagation mean time interval calculation part (53) calculates the propagation mean time interval, by calculating a quotient which is obtained by dividing by 2 a difference of subtracting a sum of the main transmission mean time point, and a product obtained by multiplying the subordinate reception mean time point by the speed ratio, from a sum of the main reception mean time point, and a product obtained by multiplying the subordinate reception mean time point by the speed ratio.

With the correction parameter calculation device, the correction parameter can be calculated accurately even if the propagation time intervals of the sync signals are not constant.

The correction parameter calculation device (14; 1, 2) further has a reference time point calculation part (54; slave corrected time point generating device 242).

The reference time point calculation part calculates, as a main reference time point, a time point of the main clock device (21; 100) in a case where the time point of the subordinate clock device (31; 200) is the subordinate reception mean time point, by calculating a sum of the main transmission mean time point and the propagation mean time interval.

With the correction parameter calculation device, the correction parameter can be calculated accurately even if the propagation time intervals of the sync signals are not constant.

The correction parameter calculation device (14) further has a subordinate transmission time point storage part (46), a main reception time point storage part (48), and a reference time point calculation part (54).

The subordinate transmission time point storage part stores respective subordinate transmission time points at which the subordinate device has transmitted a subordinate sync signal a plurality of times and which are measured using the subordinate clock device (31).

The main reception time point storage part stores respective main reception time points at which the main device has received the subordinate sync signal a plurality of times and which are measured using the main clock device (21).

The reference time point calculation part calculates, as a main reference time point, a time point of the main clock device in a case where a time point of the subordinate clock device is a subordinate reference time point obtained by dividing by 2 a sum of the subordinate reception mean time point, and a subordinate transmission mean time point being a mean of the subordinate transmission time points, by calculating a quotient which is obtained by dividing by 2 a sum of the main transmission mean time point, and a main reception mean time point being a mean of the main reception time points.

With the correction parameter calculation device, the correction parameter can be calculated accurately even if the propagation time intervals of the sync signals are not constant.

A system (time point synchronization system 10) described above includes a main device (12; 1), a subordinate device (13; 2), and a correction parameter calculation device (14; 1, 2).

The main device has the main clock device (21; 100), a main transmission part (22; master transmission device 110), and a main transmission time point measuring part (23, 110).

The main clock device measures a time point.

The main transmission part transmits the main sync signal a plurality of times.

The main transmission time point measuring part measures, as the main transmission time points, respective time points at which the main transmission part has transmitted the main sync signal, using the main clock device.

The subordinate device has the subordinate clock device (31; 200), a subordinate reception part (32; slave reception device 220), and a subordinate reception time point measuring part (33; slave reception time point 1 storage device 221).

The subordinate clock device measures a time point.

The subordinate reception part receives the main sync signal a plurality of times.

The subordinate reception time point measuring part measures, as the subordinate reception time points, respective time points at which the subordinate reception part has received the main sync signal, using the subordinate clock device.

With the above system, the correction parameter can be calculated accurately even if the propagation time intervals of the sync signals are not constant.

The subordinate device (13; 2) further has a synchronized time point calculation part (39; slave corrected time point generating device 242).

The synchronized time point calculation part calculates a corrected time point synchronized with the time point of the main clock device, by correcting the time point measured by the subordinate clock device based on the speed ratio calculated by the correction parameter calculation device (14; 1, 2).

With the above system, a corrected time point synchronized with the time point of the main clock device can be calculated accurately even if the propagation time intervals of the sync signals are not constant.

The subordinate device (13; 2) further has a subordinate transmission part (35; slave transmission device 210) and a subordinate transmission time point measuring part (36; slave transmission time point 1 storage device 211).

The subordinate transmission part transmits a subordinate sync signal a plurality of times.

The subordinate transmission time point measuring part measures, as subordinate transmission time points, respective time points at which the subordinate transmission part has transmitted the subordinate sync signal, using the subordinate clock device.

The main device (12; 1) further has a main reception part (25; master reception device 120) and a main reception time point measuring part (26; master reception time point 1 storage device 121).

The main reception part receives the subordinate sync signal a plurality of times.

The main reception time point measuring part measures, as main reception time points, respective time points at which the main reception part has received the subordinate sync signal, using the main clock device.

The correction parameter calculation device further has a propagation mean time interval calculation part (53; 240) and a reference time point calculation part (54; 242).

The propagation mean time interval calculation part calculates a propagation mean time interval being a mean of a main propagation time interval from a time point at which the main device has transmitted the main sync signal to a time point at which the subordinate device has received the main sync signal, and a subordinate propagation time interval from a time point at which the subordinate device has transmitted the subordinate sync signal to a time point at which the main device has received the subordinate sync signal, based on the main transmission mean time point, the subordinate reception mean time point, a subordinate transmission mean time point being a mean of the subordinate transmission time points, and a main reception mean time point being a mean of the main reception time points.

The reference time point calculation part calculates, as a main reference time point, a time point of the main clock device (21; 100) in a case where the time point of the subordinate clock device (31; 200) is the subordinate reception mean time point, by calculating a sum of the main transmission mean time point and the propagation mean time interval.

The synchronized time point calculation part (39; 242) calculates the corrected time point, by calculating a sum of a product obtained by multiplying by the speed ratio a difference of subtracting the subordinate reception mean time point from the time point measured by the subordinate clock device, and the main reference time point.

With the above system, a corrected time point synchronized with the time point of the main clock device can be calculated accurately even if the propagation time intervals of the sync signals are not constant.

The subordinate device (13; 2) further has a subordinate transmission part (35; 210) and a subordinate transmission time point measuring part (36; 211).

The subordinate transmission part transmits a subordinate sync signal a plurality of times.

The subordinate transmission time point measuring measures, as subordinate transmission time points, respective time points at which the subordinate transmission part has transmitted the subordinate sync signal, using the subordinate clock device (31; 200).

The main device (12; 1) further has a main reception part (25; 120) and a main reception time point measuring part (26; 121).

The main reception part receives the subordinate sync signal a plurality of times.

The main reception time point measuring part measures, as main reception time points, respective time points at which the main reception part has received the subordinate sync signal, using the main clock device.

The correction parameter calculation device (14; 1, 2) further has a reference time point calculation part (54; 242).

The reference time point calculation part calculates, as a main reference time point, a time point of the main clock device (21; 100) in a case where the time point of the subordinate clock device (31; 200) is a subordinate reference time point obtained by dividing by 2 a sum of the subordinate reception mean time point, and a subordinate transmission mean time point being a mean of the subordinate transmission time points, by calculating a quotient which is obtained by dividing by 2 a sum of the main transmission mean time point, and a main reception mean time point being a mean of the main reception time points.

The synchronized time point calculation part (39; 242) calculates the corrected time point, by calculating a sum of a product obtained by multiplying by the speed ratio a difference of subtracting the subordinate reference time point from the time point measured by the subordinate clock device, and the main reference time point.

With the above system, a corrected time point synchronized with the time point of the main clock device can be calculated accurately even if the propagation time intervals of the sync signals are not constant.

The correction parameter calculation method described above has the following procedures.

A main device (12; 1) transmits a main sync signal (measuring frame) a plurality of times.

A subordinate device (13; 2) receives the main sync signal a plurality of times.

Respective main transmission time points at which the main device has transmitted the main sync signal are measured, using a main clock device (21; 100).

Respective subordinate reception time points at which the subordinate device has received the main sync signal are measured, using a subordinate clock device (31; 200).

A speed ratio of a ticking time speed of the main clock device to a ticking time speed of the subordinate clock device is calculated, based on a main transmission mean time point being a mean of the main transmission time points, and a subordinate reception mean time point being a mean of the subordinate reception time points.

With the above correction parameter calculation method, the speed ratio can be calculated accurately even if the propagation time intervals of the sync signals are not constant.

The correction parameter calculation device (14; 1, 2) descried above can be implemented by executing a computer program with a computer (90).

With the computer program that causes the computer to function as the correction parameter calculation device, the correction parameter can be calculated accurately even if the propagation time intervals of the sync signals are not constant.

REFERENCE SIGNS LIST

1: master; 2: slave; 10: time point synchronization system; 11: network; 12: main device; 13: subordinate device; 14: correction parameter calculation device; 21: main clock device; 22: main transmission part; 23: main transmission time point measuring part; 24: main transmission time point notification part; 25: main reception part; 26: main reception time point measuring part; 27: main reception time point notification part; 31: subordinate clock device; 32: subordinate reception part; 33: subordinate reception time point measuring part; 34: subordinate reception time point notification part; 35: subordinate transmission part; 36: subordinate transmission time point measuring part; 37: subordinate transmission time point notification part; 38: correction parameter acquisition part; 39: synchronized time point calculation part; 41: main transmission time point acquisition part; 42: main transmission time point storage part; 43: subordinate reception time point acquisition part; 44: subordinate reception time point storage part; 45: subordinate transmission time point acquisition part; 46: subordinate transmission time point storage part; 47: main reception time point acquisition part; 48: main reception time point storage part; 51: mean calculation part; 511, 512: main transmission mean time point calculation part; 513, 514: subordinate reception mean time point calculation part; 515: subordinate transmission mean time point calculation part; 516: main reception mean time point calculation part; 517: mean main transmission/reception time point product calculation part; 518: mean subordinate transmission/reception time point product calculation part; 519: mean square subordinate reception time point calculation part; 510: mean square subordinate transmission time point calculation part; 52: speed ratio calculation part; 521: main transmission time point difference calculation part; 522: subordinate reception time point difference calculation part; 523: quotient calculation part; 524: transmission/reception time point product difference calculation part; 525: subordinate time point square difference calculation part; 53: propagation mean time interval calculation part; 531: main transmission/reception mean time point difference calculation part; 532: subordinate reception/transmission mean time point difference calculation part; 533: round-trip propagation mean time interval calculation part; 534: single-way propagation mean time interval calculation part; 54: reference time point calculation part; 541: subordinate reference time point calculation part; 542: main reference time point calculation part; 55: correction parameter notification part; 60: time point synchronization process; 61: first measuring process; 611, 621: main sync signal transmission step; 612: subordinate sync signal reception step; 613, 618, 623, 628: end determination step; 62: second measuring process; 616, 626: main sync signal reception step; 617: subordinate sync signal transmission step; 63: correction parameter calculation process; 631: mean calculation step; 632: speed ratio calculation step; 633: propagation mean time interval calculation step; 634: reference time point calculation step; 635: correction parameter notification step; 69: synchronized time point calculation process; 691: time point measuring step; 692: corrected time point calculation step; 90: computer; 91: control device; 92: input device; 93: output device; 94: storage device; 95: operational calculation device; 100: master clock; 110: master transmission device; 120: master reception device; 121: master reception time point 1 storage device; 122: master reception time point 2 storage device; 123: master reception time point n storage device; 124: master mean reception time point calculation device; 200: slave clock; 210: slave transmission device; 211: slave transmission time point 1 storage device; 212: slave transmission time point 2 storage device; 213: slave transmission time point n storage device; 214: slave mean transmission time point calculation device; 220: slave reception device; 221: slave reception time point 1 storage device; 222: slave reception time point 2 storage device; 223: slave reception time point n storage device; 224: slave mean reception time point calculation device; 225: slave mean reception time point storage device; 231: master transmission time point 1 storage device; 232: master transmission time point 2 storage device; 233: master transmission time point n storage device; 234: master mean transmission time point calculation device; 235: master mean transmission time point storage device; 240: mean propagation delay calculation device; 241: quartz deviation ratio calculation device; 242: slave corrected time point generating device

The invention claimed is:

1. A system, comprising:
a subordinate device; and
a correction parameter calculation device including:
a main transmission time point memory that stores main transmission time points at which a main device has transmitted a plurality of main sync signals and which are measured using a main clock,
a subordinate reception time point memory that stores subordinate reception time points at which the subordinate device has received the plurality of main sync signals and which are measured using a subordinate clock, and speed ratio calculation circuitry that calculates a speed ratio of a ticking time speed of the main clock to a ticking time speed of the subordinate clock based on a main transmission mean time point that is a mean of the main transmission time points and a subordinate reception mean time point that is a mean of the subordinate reception time points, the subordinate device including:
a subordinate clock that measures a time point,
a subordinate receiver that receives the main sync signal a plurality of times,
subordinate reception time point measuring circuitry that measures, as the subordinate reception time points, time points at which the subordinate receiver has received the main sync signal, using the subordinate clock, and
synchronized time point calculation circuitry that calculates a corrected time point synchronized with the time point of the main clock, by correcting the time point measured by the subordinate clock based on the speed ratio.

2. The system according to claim 1, wherein the speed ratio calculation circuitry includes:
main transmission time point difference calculation circuitry that calculates a main transmission time point difference obtained by subtracting, from a first main transmission mean time point being a mean of a plurality of main transmission time points stored by the main transmission time point memory for a plurality of main sync signals belonging to a first group out of the plurality of main sync signals, a second main transmission mean time point being a mean of a plurality of main transmission time points stored by the main transmission time point memory for a plurality of main sync signals belonging to a second group which is different from the first group out of the plurality of main sync signals,
subordinate reception time point difference calculation circuitry that calculates a subordinate reception time point difference obtained by subtracting, from a first subordinate reception mean time point being a mean of a plurality of subordinate reception time points stored by the subordinate reception time point memory for the plurality of main sync signals belonging to the first group, a second subordinate reception mean time point being a mean of a plurality of subordinate reception time points stored by the subordinate reception time point memory for the plurality of main sync signals belonging to the second group, and
quotient calculation circuitry that calculates the speed ratio, by calculating a quotient which is obtained by dividing the main transmission time point difference by the subordinate reception time point difference.

3. The system according to claim 1, wherein the correction parameter calculation device further comprises:
a subordinate transmission time point memory that stores subordinate transmission time points at which the subordinate device has transmitted a plurality of subordinate sync signals and which are measured using the subordinate clock; and
a main reception time point memory that stores main reception time points at which the main device has received the plurality of subordinate sync signals and which are measured using the main clock,
wherein:
$m_t$=main transmission mean time point,
$m_r$=main reception mean time point, $s_t$=subordinate transmission mean time point,
$s_r$=subordinate reception mean time point,
the speed ratio calculation circuitry includes:
product difference calculation circuitry that calculates a transmission/reception time point product difference $$\Delta ms = \overline{m_t s_r} - \overline{m_t s_r} + \overline{s_t m_r} - \overline{s_t m_r},$$

square difference calculation circuitry that calculates a subordinate time point square difference $$\Delta s^2 = \overline{s_r^2} - \overline{s_r}^2 + \overline{s_t^2} - \overline{s_t}^2, \text{ and}$$

quotient calculation circuitry that calculates the speed ratio=$\Delta ms/\Delta s^2$.

4. The system according to claim 1, wherein the correction parameter calculation device further comprises:
a subordinate transmission time point memory that stores subordinate transmission time points at which the subordinate device has transmitted a subordinate sync signal a plurality of times and which are measured using the subordinate clock;
a main reception time point memory that stores main reception time points at which the main device has received the subordinate sync signal a plurality of times and which are measured using the main clock; and
propagation mean time interval calculation circuitry that calculates a propagation mean time interval being a mean of a main propagation time interval from a time point at which the main device has transmitted the main sync signal to a time point at which the subordinate device has received the main sync signal, and a subordinate propagation time interval from a time point at which the subordinate device has transmitted the subordinate sync signal to a time point at which the main device has received the subordinate sync signal, based on the main transmission mean time point, the subordinate reception mean time point, a subordinate transmission mean time point being a mean of the subordinate transmission time points, and a main reception mean time point being a mean of the main reception time points.

5. The system according to claim 4, wherein the propagation mean time interval calculation circuitry calculates the propagation mean time interval, by calculating a quotient which is obtained by dividing by 2 a difference obtained by subtracting a sum of the main transmission mean time point and the subordinate reception mean time point, from a sum of the main reception mean time point and the subordinate reception mean time point.

6. The system according to claim 4, wherein the propagation mean time interval calculation circuitry calculates the propagation mean time interval, by calculating a quotient which is obtained by dividing by 2 a difference obtained by subtracting a sum of the main transmission mean time point, and a product obtained by multiplying the subordinate reception mean time point by the speed ratio, from a sum of the main reception mean time point, and a product obtained by multiplying the subordinate reception mean time point by the speed ratio.

7. The system according to claim 4, wherein the correction parameter calculation device further comprises:
reference time point calculation circuitry that calculates, as a main reference time point, a time point of the main clock in a case where the time point of the subordinate clock is the subordinate reception mean time point, by calculating a sum of the main transmission mean time point and the propagation mean time interval.

8. The system according to claim 1, wherein the correction parameter calculation device further comprises:
a subordinate transmission time point memory that stores subordinate transmission time points at which the subordinate device has transmitted a subordinate sync signal a plurality of times and which are measured using the subordinate clock;
a main reception time point memory that stores main reception time points at which the main device has received the subordinate sync signal a plurality of times and which are measured using the main clock; and
reference time point calculation circuitry that calculates, as a main reference time point, a time point of the main clock in a case where a time point of the subordinate clock is a subordinate reference time point obtained by dividing by 2 a sum of the subordinate reception mean time point, and a subordinate transmission mean time point being a mean of the subordinate transmission time points, by calculating a quotient which is obtained by dividing by 2 a sum of the main transmission mean time point, and a main reception mean time point being a mean of the main reception time points.

* * * * *